US012443166B2

(12) United States Patent
Abad et al.

(10) Patent No.: US 12,443,166 B2
(45) Date of Patent: Oct. 14, 2025

(54) MULTI-DOMAIN PLANNING CONTROLLER FOR DRILLING OPERATIONS

(71) Applicant: Schlumberger Technology Corporation, Sugar Land, TX (US)

(72) Inventors: Daniel Abad, Sugar Land, TX (US); Qiuhua Liu, Houston, TX (US); Rustam Isangulov, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 607 days.

(21) Appl. No.: 17/904,876

(22) PCT Filed: Feb. 24, 2021

(86) PCT No.: PCT/US2021/019414
§ 371 (c)(1),
(2) Date: Aug. 24, 2022

(87) PCT Pub. No.: WO2021/173669
PCT Pub. Date: Sep. 2, 2021

(65) Prior Publication Data
US 2023/0115153 A1   Apr. 13, 2023

Related U.S. Application Data

(60) Provisional application No. 62/980,919, filed on Feb. 24, 2020.

(51) Int. Cl.
*G05B 19/4155* (2006.01)
(52) U.S. Cl.
CPC ............ *G05B 19/4155* (2013.01); *G05B 2219/45129* (2013.01)

(58) Field of Classification Search
CPC .......... G05B 19/4183; G05B 19/41865; G05B 19/4155; G05B 2219/45129; G05B 2219/36292; E21B 2200/20; E21B 44/00
See application file for complete search history.

(56) References Cited

U.S. PATENT DOCUMENTS 11,567,737 B1 * 1/2023 Stump ................... G06F 8/34
2007/0294450 A1 * 12/2007 Rudnick ........... G05B 19/41865
710/244

(Continued)

FOREIGN PATENT DOCUMENTS

| EP | 3236385 A1 | 10/2017 |
|---|---|---|
| WO | 2019222031 A1 | 11/2019 |
| WO | 2019222033 A1 | 11/2019 |

OTHER PUBLICATIONS

KCL Planning, "ROSPlan", downloaded on Sep. 2, 2022 from [http://kcl-planning.github.io/ROSPlan/documentation/], Undated, 5 pages.

(Continued)

*Primary Examiner* — Nicholas Klicos
(74) *Attorney, Agent, or Firm* — Jeffrey D. Frantz

(57) ABSTRACT

A method can include, in a runtime environment of compiled multi-domain code for multiple different domains that describe physical operations performed using equipment, responsive to input, issuing a call to a planning domain definition language planner; responsive to the call, receiving a plan that includes at least one action; and dispatching at least one of the at least one action to call for performance of at least a portion of at least one of the physical operations.

18 Claims, 19 Drawing Sheets

(56) References Cited

U.S. PATENT DOCUMENTS

| | | | |
|---|---|---|---|
| 2009/0152005 A1 | 6/2009 | Chapman et al. | |
| 2013/0030706 A1* | 1/2013 | Spencer | E21B 47/00 |
| | | | 702/9 |
| 2015/0075866 A1* | 3/2015 | Tjhang | E21B 44/00 |
| | | | 175/45 |
| 2016/0252897 A1 | 9/2016 | Ashok et al. | |
| 2018/0291713 A1* | 10/2018 | Jeanson | E21B 43/11 |
| 2019/0354911 A1 | 11/2019 | Alaniz | |
| 2020/0057832 A1 | 2/2020 | Barth et al. | |
| 2021/0089276 A1* | 3/2021 | Dunn | G06F 8/41 |
| 2022/0083740 A1* | 3/2022 | von der Heyde | G06F 16/322 |

OTHER PUBLICATIONS

Search Report and Written Opinion of International Patent Application No. PCT/US2021/019414 dated Jun. 15, 2021, 9 pages.
Extended Search Report issued in European Patent Application No. 21760777.9 dated Apr. 3, 2024, 6 pages.

* cited by examiner

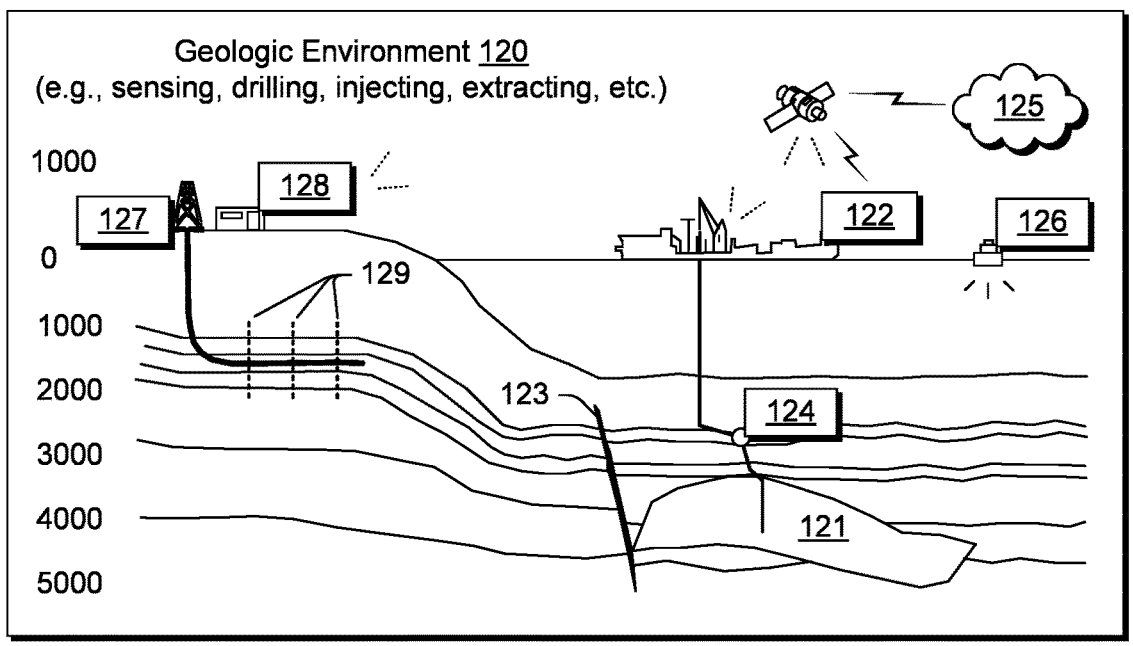
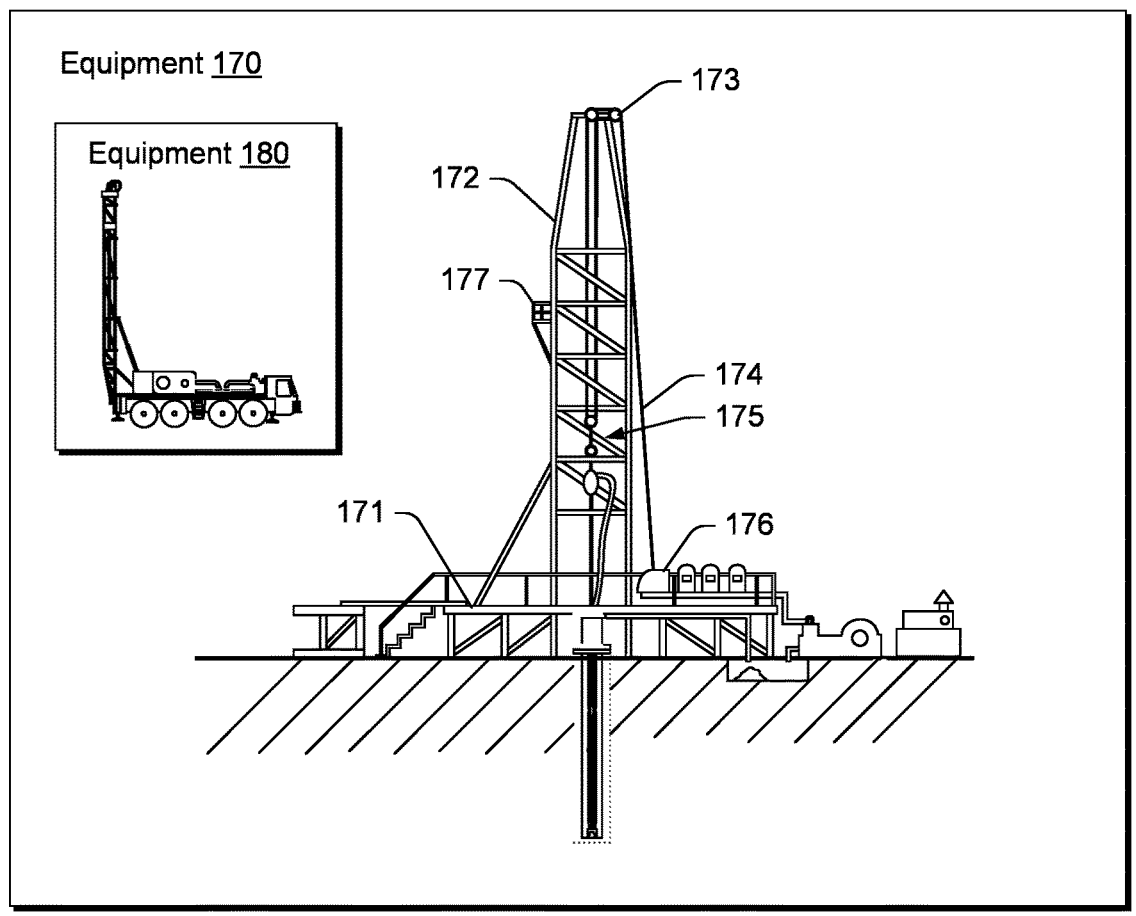
Fig. 1

800

```
(runtime)
(:namespace (:domain bread)
       (:function (available ?o - oven-spec)
               (let ((is-empty (?o .is-empty)))
                      (and (not-nil is-empty) is-empty)))
       (:function (cleaning-time ?o - oven-spec)
               (let ((ct (?o .cleaning-time)))
                      (if (nil ct) 30 ct)))
       (:function (oven-clean ?o - oven-spec)
               (let ((cleaning-oven (window true :action (clean-oven ?o))))
                      (elapsed cleaning-oven :geq (cleaning-time ?o) :seconds)))
       (:function (baked ?d - dough-spec)
               (baking::baked ?d))
       (:function (mixed ?d - dough-spec)
               (window (and (mixing::mixed ?d)
                      (mixing::rested ?d))
               :problem (mixing::mix-bread ?d)
               :right-open))
       (:function (mixing-time ?d dough-spec)
               (+ (mixing::mixing-time ?d)
                      (mixing::resting-time ?d)))
       (:function (baking-time ?o - oven-spec ?d - dough-spec)
               (+ (baking::preheat-time ?o ?d)
                      (baking::baking-time ?d)))
       (:problem bake-breads
       :goal (all-baked)
       :type-map ((dough :type dough-spec))
       :objects ((brick - oven :atomic brick-oven)
               (kitchen - oven :atomic kitchen-oven))
       :init    ((= (all-baked) false)
               (= (can-use-mixer) true)
               (= (breads-baked brick) 0)
               (= (breads-baked kitchen) 0)
               (= (max-bake-count brick) 2)
               (= (max-bake-count kitchen) 3))
       :metric (minimize total-time)
       :time-unit seconds
       :dispatch-actor baker
       :arbitration-level 0
       :arbitration-domains (baking))
       (:action-dispatch mix-dough
               :sub-problem (mixing::mix-bread :action-params))
       (:action-dispatch bake-bread
               :sub-problem (baking::bake bread :action-params))
) ;; end namespace baking
```

Plans | Problems and Atomics | Functions

Green Dot Time
Objects altitude-factor atomic

⊙
0s

Green Dot Time    0s
Value             1 brick-oven atomic

⊙
0s

Green Dot Time    0
Value
  is-empty            true
  cleaning-time       22
  temperature         0
  properties.quality  1.1
  properties.max-temp 1000 kitchen-oven atomic

⊙
0s
Green Dot Time    0
Value
  is-empty            true
  cleaning-time       22
  temperature         0
  properties.quality  1.1
  properties.max-temp 1000 mixer-on atomic

---

Edit brick-oven     1030

Entry time
0s          ☐ nil?

⬤◯ is empty      ☐ nil?

cleaning-time (int32)
22          ☐ nil?

temperature (float64)
0          ☐ nil?

properties.quality (float64)
1.1          ☐ nil?

properties.max-temp (float32)
1000          ☐ nil?

CANCEL     EDIT

Fig. 10

| Plans | | | 0s ⓘ ⓘ ▲ ⓘ ⓘ ⓘ x1 | | 1100 |
|---|---|---|---|---|---|
| | | | Problems and Atomics | | Functions |
| atomic | | | bread | | |
| (altitude-factor) | float32 | 1 | (max-bake-count brick) | int64 | 2 |
| (brick-oven) | oven-spec | [true,22,0,1.1,1000] | (max-bake-count kitchen) | int64 | 3 |
| (kitchen-oven) | oven-spec | [true,35,0,0.9,700] | (mixed white) | bool | false |
| (mixer-on) | bool | false | (mixed wheat) | bool | false |
| (mixer-scale) | float64 | 1 | (mixing-time wheat) | int64 | 8 |
| (mixer-timeout-ms) | int32 | 5000 | (mixing-time white) | int64 | 6 |
| | | | (oven-clean kitchen) | bool | false |
| baking | | | (oven-clean brick) | bool | false |
| (baked wheat) | bool | false | | | |
| (baked white) | bool | false | mixer | | |
| (baking-time white) | float64 | 12 | (all-mixed) | bool | false |
| (baking-time wheat) | float64 | 11 | (dough-mixed-for-time wheat) | bool | false |
| (get-preheat-property brick) | float64 | 1.1 | (dough-mixed-for-time white) | bool | false |
| (get-preheat-property wheat) | float64 | 500 | (dough-mixed-for-time white) | bool | false |
| (get-preheat-property kitchen) | float64 | 0.9 | (dough-mixed-for-time white) | bool | false |
| (get-preheat-property white) | float64 | 550 | (mixed white) | bool | false |

(:durative-action drillAStand ; Drill until reach connection (aka until the end of the stand)
:parameters ()
:duration (= ?duration (/ (- (connectionDepth) (holeDepth)) (drillingRop)))
:condition (and
    (at start (< (connectionDepth) (targetDepth)))
    (at start (< (standCountForFrictionTest) (frictionTestStandsFrequencyMinusOne)))
    )
:effect (and
    (at end (assign (holeDepth)(connectionDepth)))
    (at end (assign (connectionDepth) (+ (connectionDepth) (+ (standLength) 2.6))))
    (at end (drilledAStandDone))
    (at end (assign (standCountForFrictionTest) (+ (standCountForFrictionTest) 1)))
    )
)

(:durative-action drillAStandWithFrictionTest ; Drill until reach connection (aka until the end of the stand)
:parameters ()
:duration (= ?duration (/ (- (connectionDepth) (holeDepth)) (drillingRop)))
:condition (and
    (at start (< (connectionDepth) (targetDepth)))
    (at start (= (standCountForFrictionTest) (frictionTestStandsFrequencyMinusOne)))
)
:effect (and
    (at end (assign (holeDepth)(connectionDepth)))
    (at end (assign (connectionDepth) (+ (connectionDepth) (standLength))))
    (at end (drilledAStandDone))
    (at start (assign (standCountForFrictionTest) 0))
    )
)

(:durative-action drillLastStandToTargetDepth ; Drill until you reach the final target
:parameters ( )
:duration (= ?duration (/ (- (targetDepth) (holeDepth)) (drillingRop)))
:condition (and
    (at start (<= (targetDepth) (connectionDepth)))
    (at start (< (standCountForFrictionTest) (frictionTestStandsFrequencyMinusOne)))
    )
:effect (and
    (at end (atTarget))
    (at end (assign (holeDepth)(targetDepth)))
    (at end (offBottom))
    (at end (assign (standCountForFrictionTest) (+ (standCountForFrictionTest) 1)))
    )
)

```
;;;; run time file for drill to depth
(runtime) ;;; start of every run time file (:namespace (:domain DrillToDepth)
; functions and probem file definition
        (:function(atTarget)
          (DrillAStand::atTarget))

(:function(offBottom)
          (DrillAStand::offBottom))

(:function (standLength)
          (DrillAStand::standLength))

(:function (targetDepth)
          (DrillAStand::targetDepth))

(:function(drilledAStandDone)
          (or (window (DrillAStand::newStandConnected) :action drillAStand :end)
              (window (DrillAStand::newStandConnected) :action drillAStandWithFrictionTest :end)))

(:problem drill-to-depth
        :goal (atTarget)
        :init ((= (standCountForFrictionTest) 0))
        :time-unit minutes
        :dispatch-actor Automation
        :arbitration-level 0 ; Question: double check on this
        :arbitration-domains (DrillAStand))

(:action-dispatch drillAStand
        :sub-problem(DrillAStand::drill-a-stand :action-params)) ; Question: Need the last (:action-dispatch drillLastStandToTargetDepth
        :sub-problem (DrillAStand::drill-last-stand-to-targetdepth :action-params))

(:action-dispatch drillAStandWithFrictionTest
        :sub-problem (DrillAStand::drill-a-stand :action-params))

(:action-dispatch drillLastStandToTargetDepthWithFrictionTest
        :sub-problem (DrillAStand::drill-last-stand-to-targetdepth :action-params))

) ; ; end namespace DrillToDepth
```

Fig. 14

Method 1600

In a runtime environment of compiled multi-domain code for multiple different domains that describe physical operations, responsive to input, issue a call to a planning domain definition language (PDDL) planner
1610

CRM 1611

Responsive to the call, receive a plan that includes at least one action
1620

CRM 1621

Dispatch at least one of the at least one action to call for performance of at least a portion of at least one of the physical operations
1630

CRM 1631

System 1690

1691

Computer(s) 1692

Processor(s) 1693

Memory 1694

Network(s) 1695

Instructions 1696

Fig. 16

MULTI-DOMAIN PLANNING CONTROLLER FOR DRILLING OPERATIONS

RELATED APPLICATIONS

This application is a National Stage entry of International Patent Application No. PCT/US2021/019414 filed Feb. 24, 2021, which claims priority to U.S. Provisional Application No. 62/980,919 filed Feb. 24, 2020, which is incorporated by reference herein.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore (e.g., a borehole) may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning and/or development can occur over one or more phases, which can include an exploration phase that aims to identify and assess an environment (e.g., a prospect, a play, etc.), which may include drilling of one or more bores (e.g., one or more exploratory wells, etc.).

SUMMARY

A method can include, in a computer runtime environment of compiled multi-domain code for multiple different domains that describe physical operations performed using equipment, responsive to input, issuing a call to a planning domain definition language planner; responsive to the call, receiving a plan that includes at least one action; and dispatching at least one of the at least one action to call for performance of at least a portion of at least one of the physical operations. A system can include a processor; memory accessible to the processor; processor-executable instructions stored in the memory and executable by the processor to instruct the system to: in a runtime environment of compiled multi-domain code for multiple different domains that describe physical operations, responsive to input, issue a call to a planning domain definition language planner; responsive to the call, receive a plan that includes at least one action; and dispatch at least one of the at least one action to call for performance of at least a portion of at least one of the physical operations. One or more computer-readable storage media can include computer-executable instructions executable to instruct a computing system to: in a runtime environment of compiled multi-domain code for multiple different domains that describe physical operations, responsive to input, issue a call to a planning domain definition language planner; responsive to the call, receive a plan that includes at least one action; and dispatch at least one of the at least one action to call for performance of at least a portion of at least one of the physical operations. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 8 illustrates an example of code;

FIG. 10 illustrates examples of graphical user interfaces (GUIs);

FIG. 11 illustrates an example of a graphical user interface (GUI);

FIG. 13 illustrates an example of code;

FIG. 14 illustrates an example of code;

FIG. 16 illustrates an example of a method and an example of a system;

DETAILED DESCRIPTION

Figure 2:
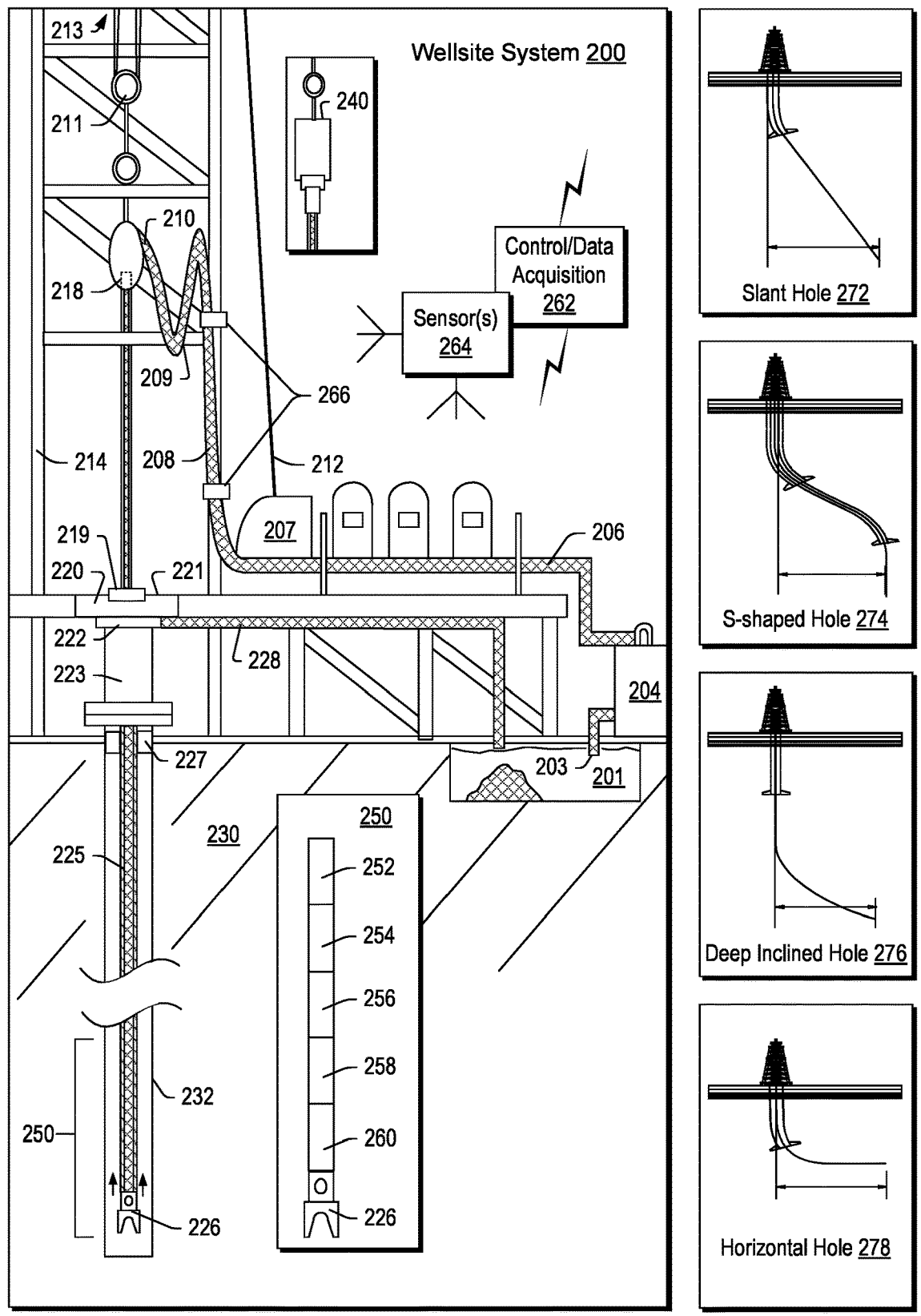
FIG. 2 illustrates examples of equipment and examples of hole types.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion (e.g., a lateral portion) that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system (e.g., an offshore rig, etc.).

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced. As an example, a trip that pulls equipment out of a borehole may be referred to as pulling out of hole (POOH) and a trip that runs equipment into a borehole may be referred to as running in hole (RIH).

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use one or more directional drilling techniques, equipment, etc.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the traveling block 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
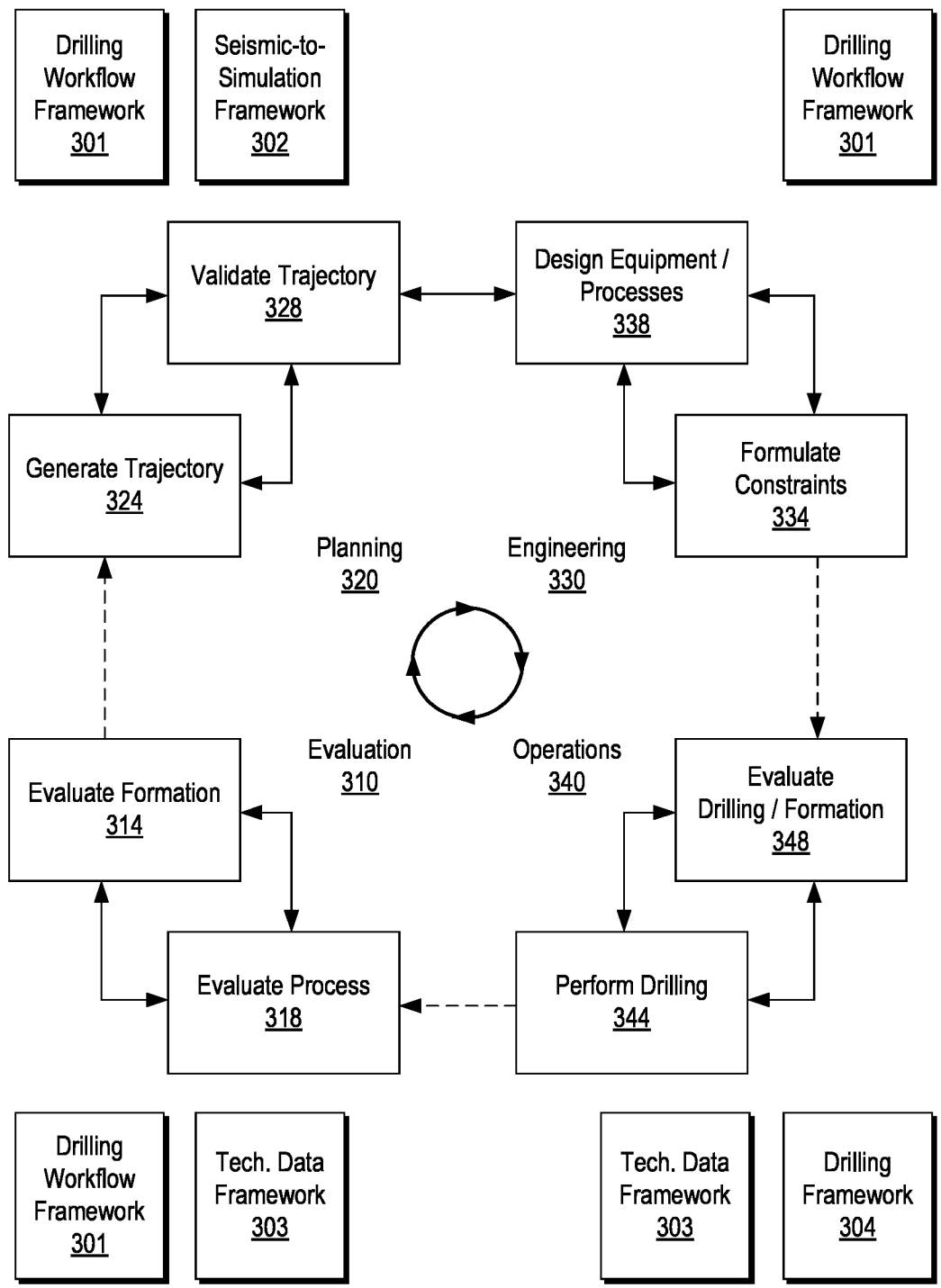
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL framework (Schlumberger, Houston, Texas) and the technical data framework 303 can be, for example, the TECHLOG framework (Schlumberger, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. An example of an object-based framework is the MICROSOFT .NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

As an example, a framework can include an analysis component that may allow for interaction with a model or model-based results (e.g., simulation results, etc.). As to simulation, a framework may operatively link to or include a simulator such as the ECLIPSE reservoir simulator (Schlumberger, Houston Tex.), the INTERSECT reservoir simulator (Schlumberger, Houston Tex.), etc.

The aforementioned PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As mentioned with respect to the DELFI environment, one or more frameworks may be interoperative and/or run upon one or another. As an example, a framework environment marketed as the OCEAN framework environment (Schlumberger, Houston, Texas) may be utilized, which allows for integration of add-ons (or plug-ins) into a PETREL framework workflow. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. In a framework environment (e.g., OCEAN, DELFI, etc.), a model simulation layer can include or operatively link to a model-centric framework. In an example embodiment, a framework may be considered to be a data-driven application. For example, the PETREL framework can include features for model building and visualization. As an example, a model may include one or more grids where a grid can be a spatial grid that conforms to spatial locations per acquired data (e.g., satellite data, logging data, seismic data, etc.).

As an example, a model simulation layer may provide domain objects, act as a data source, provide for rendering and provide for various user interfaces. Rendering capabilities may provide a graphical environment in which applications can display their data while user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL framework, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA framework, marketed by Schlumberger, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL framework, etc.).

As an example, a workflow may be a process implementable at least in part in a framework environment and by one or more frameworks. As an example, a workflow may include one or more worksteps that access a set of instructions such as a plug-in (e.g., external executable code, etc.). As an example, a framework environment may be cloud-based where cloud resources are utilized that may be operatively coupled to one or more pieces of field equipment such that data can be acquired, transmitted, stored, processed, analyzed, etc., using features of a framework environment. As an example, a framework environment may employ various types of services, which may be backend, frontend or backend and frontend services. For example, consider a client-server type of architecture where communications may occur via one or more application programming interfaces (APIs), one or more microservices, etc.

As an example, a framework may provide for modeling petroleum systems. For example, the modeling framework marketed as the PETROMOD framework (Schlumberger, Houston, Texas), which includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

As an example, the MANGROVE framework (Schlumberger Limited, Houston, Texas) may be utilized for one or more stimulation workflows. Such a framework can help to optimize stimulation design in a reservoir-centric environment, for example, by predicting geomechanical propagation of hydraulic fractures and/or production forecasts within 3D reservoir models. Such an approach can facilitate understanding of heterogeneous interactions between hydraulic and natural fracture networks and/or optimize the number and location of fracture treatment stages, for example, to help increase perforation efficiency and recovery. As an example, a workflow can include integrating microseismic data and a discrete fracture network (DFN) model in unconventional fracture modeling, which may help an operator to understand and characterize fracture geometry.

Hydraulic fracturing can be referred to as a stimulation treatment, which may be suitable for oil and gas wells in low-permeability reservoirs. In such an operation, engineered fluids can be pumped at high pressure and rate into a reservoir interval to be treated, causing a fracture to open, which may have wings that extend away from a wellbore in opposing directions according to the natural stresses within the formation. A hydraulic fracturing operation can include use of proppant such as grains of sand of a particular size that can be mixed with treatment fluid to keep the fracture open when a treatment is complete. Hydraulic fracturing can help to create high-conductivity communication with a large area of formation and may aim to bypass damage that may exist in the near-wellbore area.

As an example, microseismic monitoring may be utilized in combination with hydraulic fracturing. Such a technique can help to track the propagation of a hydraulic fracture as it advances through a formation. For example, microseisms can be detected using sensors where the microseisms can be located and displayed in time for approximating the location and the propagation of a hydraulic fracture during a hydraulic fracturing operation. As an example, a computational framework may provide for modeling, survey design, microseismic detection and location, uncertainty analysis, data integration, and visualization for interpretation. As an example, computer imagery may be utilized to monitor activity in a multidimensional space relative to the location of the fracturing treatment. As an example, monitored activities may be animated to show progressive fracture growth and the subsurface response to pumping variations. When displayed in real time, the microseismic activity can provide for making changes to a stimulation operation, for example, to help to ensure optimal reservoir contact (e.g., that a fluid network is in contact with a reservoir such that fluid can be produced from the reservoir). Effectiveness of a stimulation of a reservoir may be used to enhance reservoir development, for example, in shale gas completions.

As an example, various aspects of a workflow may be completed automatically, may be partially automated, or may be completed manually, as by a human user interfacing with a software application that executes using hardware (e.g., local and/or remote). As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO framework tools (Schlumberger Limited, Houston, Texas), and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc., basis.

Well planning can include determining a path of a well (e.g., a trajectory) that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 4:
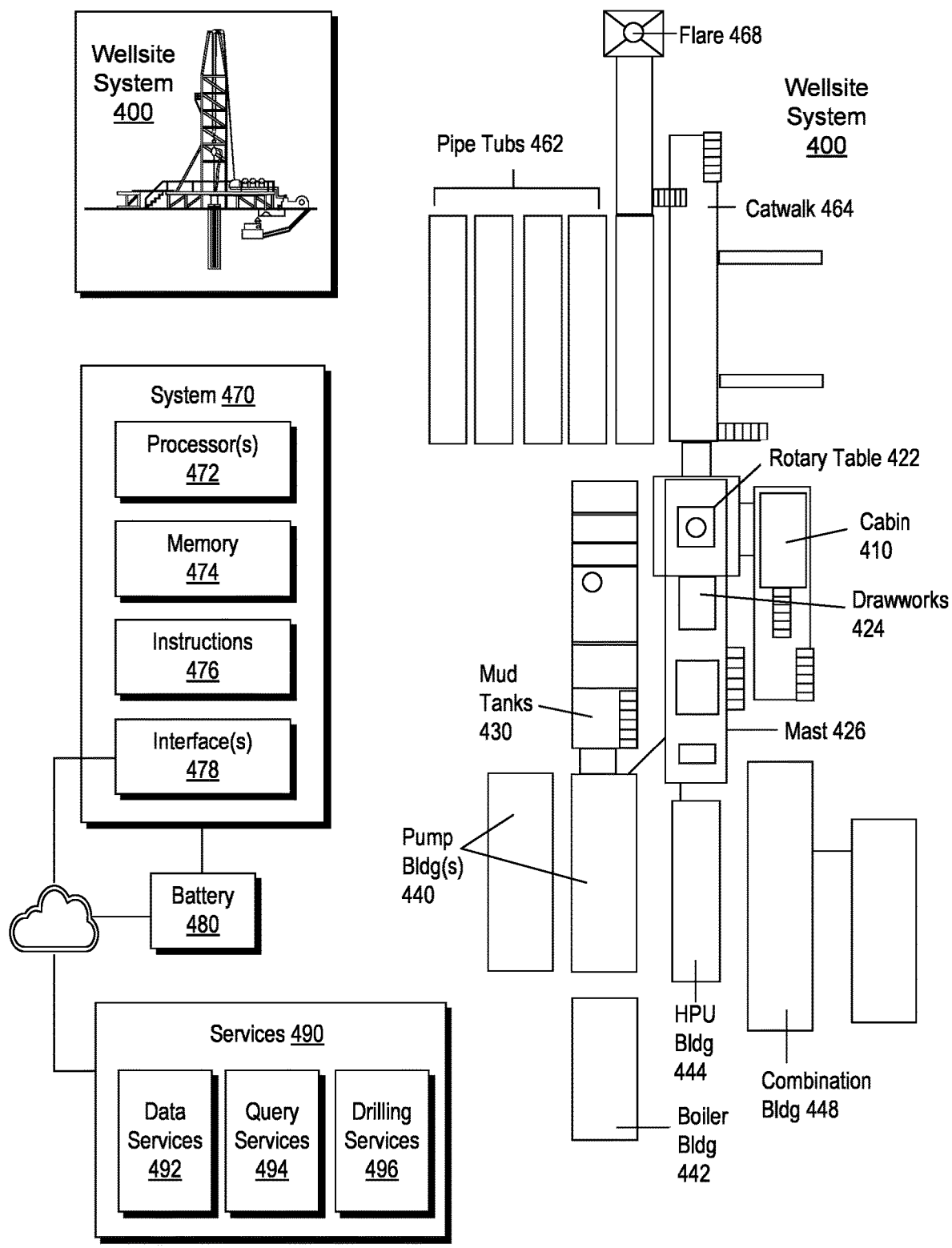
FIG. 4 illustrates an example of a wellsite system and an example of a computing system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, the system 470 may be utilized to generate one or more sequences and/or to receive one or more sequences, which may, for example, be utilized to control one or more drilling operations. For example, consider a sequence that includes a sliding mode and a drilling mode and a transition therebetween.

Figure 5:
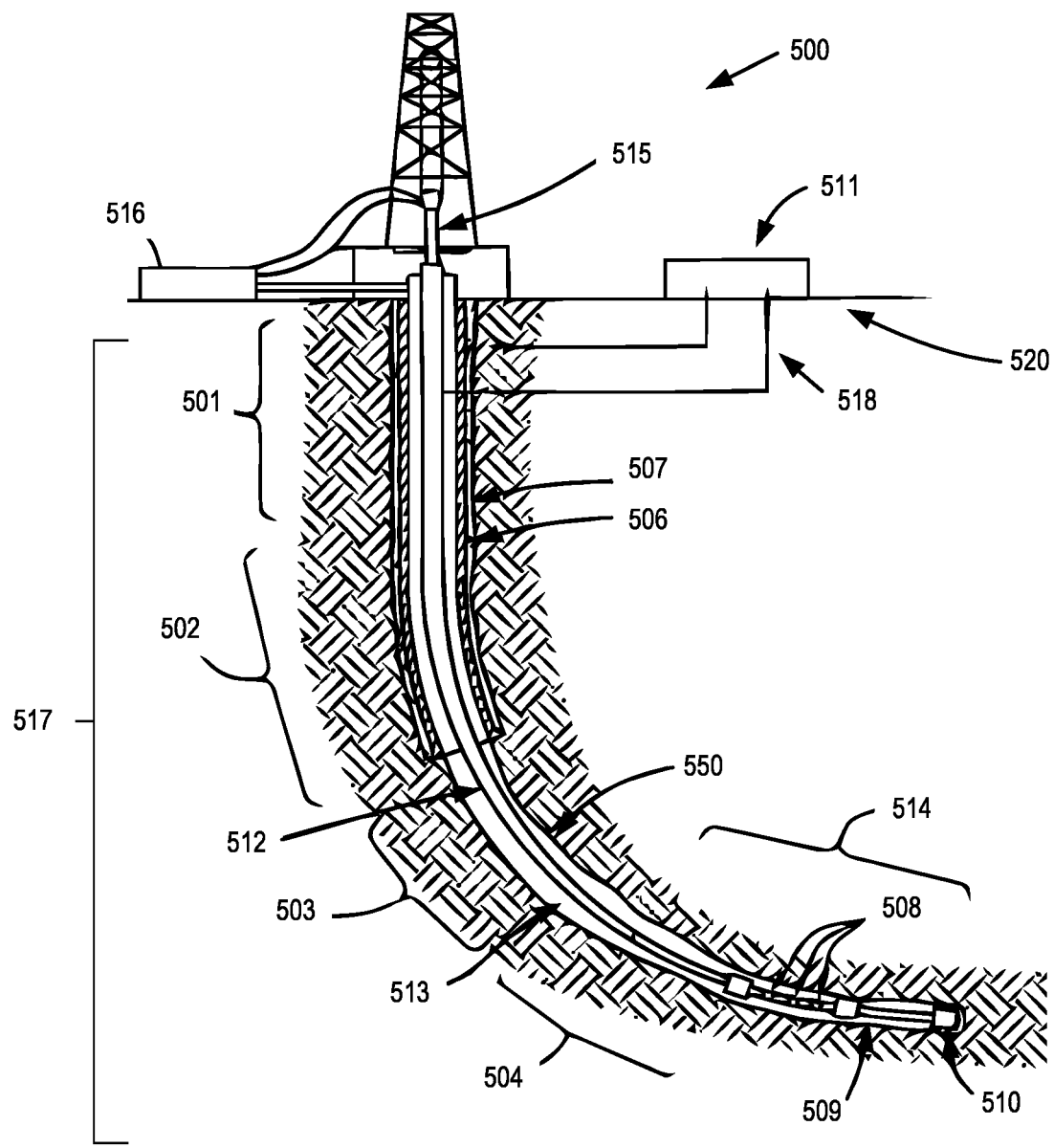
FIG. 5 illustrates an example of equipment in a geologic environment.

FIG. 5 shows a schematic diagram depicting an example of a drilling operation of a directional well in multiple sections. The drilling operation depicted in FIG. 5 includes a wellsite drilling system 500 and a field management tool 520 for managing various operations associated with drilling a bore hole 550 of a directional well 517. The wellsite drilling system 500 includes various components (e.g., drillstring 512, annulus 513, bottom hole assembly (BHA) 514, kelly 515, mud pit 516, etc.). As shown in the example of FIG. 5, a target reservoir may be located away from (as opposed to directly under) the surface location of the well 517. In such an example, special tools or techniques may be used to ensure that the path along the bore hole 550 reaches the particular location of the target reservoir.

As an example, the BHA 514 may include sensors 508, a rotary steerable system (RSS) 509, and a bit 510 to direct the drilling toward the target guided by a pre-determined survey program for measuring location details in the well. Furthermore, the subterranean formation through which the directional well 517 is drilled may include multiple layers (not shown) with varying compositions, geophysical characteristics, and geological conditions. Both the drilling planning during the well design stage and the actual drilling according to the drilling plan in the drilling stage may be performed in multiple sections (see, e.g., sections 501, 502, 503 and 504), which may correspond to one or more of the multiple layers in the subterranean formation. For example, certain sections (e.g., sections 501 and 502) may use cement 507 reinforced casing 506 due to the particular formation compositions, geophysical characteristics, and geological conditions.

In the example of FIG. 5, a surface unit 511 may be operatively linked to the wellsite drilling system 500 and the field management tool 520 via communication links 518. The surface unit 511 may be configured with functionalities to control and monitor the drilling activities by sections in real time via the communication links 518. The field management tool 520 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 518 according to a drilling operation workflow. The communication links 518 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real time data associated with one or more operations such as, for example, a drilling operation or drilling operations. As an example, consider the PERFORM toolkit framework (Schlumberger Limited, Houston, Texas).

As an example, a service can be or include one or more of OPTIDRILL, OPTILOG and/or other services marketed by Schlumberger Limited, Houston, Texas.

The OPTIDRILL technology can help to manage downhole conditions and BHA dynamics as a real time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO framework).

The OPTILOG technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Tex.) may be provided for one or more wellsite operations. In such an example, data may be acquired and stored where such data can include time series data that may be received and analyzed, etc.

As an example, one or more M-I SWACO services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX services (e.g., via the ONE-TRAX software platform, M-I L.L.C., Houston, Texas) may be provided for one or more wellsite operations. In such an example, data may be acquired and stored where such data can include time series data that may be received and analyzed, etc.

As an example, various operations can be defined with respect to WITS or WITSML, which are acronyms for well-site information transfer specification or standard (WITS) and markup language (WITSML). WITS/WITSML specify how a drilling rig or offshore platform drilling rig can communicate data. For example, as to slips, which are an assembly that can be used to grip a drillstring in a relatively non-damaging manner and suspend the drillstring in a rotary table, WITS/WITSML define operations such as "bottom to slips" time as a time interval between coming off bottom and setting slips, for a current connection; "in slips" as a time interval between setting the slips and then releasing them, for a current connection; and "slips to bottom" as a time interval between releasing the slips and returning to bottom (e.g., setting weight on the bit), for a current connection.

Well construction can occur according to various procedures, which can be in various forms. As an example, a procedure can be specified digitally and may be, for example, a digital plan such as a digital well plan. A digital well plan can be an engineering plan for constructing a wellbore. As an example, procedures can include information such as well geometries, casing programs, mud considerations, well control concerns, initial bit selections, offset well information, pore pressure estimations, economics and special procedures that may be utilized during the course of well construction, production, etc. While a drilling procedure can be carefully developed and specified, various conditions can occur that call for adjustment to a drilling procedure.

As an example, an adjustment can be made at a rigsite when acquisition equipment acquire information about conditions, which may be for conditions of drilling equipment, conditions of a formation, conditions of fluid(s), conditions as to environment (e.g., weather, sea, etc.), etc. Such an adjustment may be made on the basis of personal knowledge of one or more individuals at a rigsite. As an example, an operator may understand that conditions call for an increase in mudflow rate, a decrease in weight on bit, etc. Such an operator may assess data as acquired via one or more sensors (e.g., torque, temperature, vibration, etc.). Such an operator may call for performance of a procedure, which may be a test procedure to acquire additional data to understand better actual physical conditions and physical phenomena that may occur or that are occurring. An operator may be under one or more time constraints, which may be driven by physical phenomena, such as fluid flow, fluid pressure, compaction of rock, borehole stability, etc. In such an example, decision making by the operator can depend on time as conditions evolve. For example, a decision made at one fluid pressure may be sub-optimal at another fluid pressure in an environment where fluid pressure is changing. In such an example, timing as to implementing a decision as an adjustment to a procedure can have a broad ranging impact. An adjustment to a procedure that is made too late or too early can adversely impact other procedures compared to an adjustment to a procedure that is made at an optimal time (e.g., and implemented at the optimal time).

As an example, a system can include one or more automation assisted features. For example, consider a feature that can generate and/or receive one or more sequences that can be utilized to control a drilling operation. In such an example, a driller may utilize a generated sequence to control one or more pieces of equipment to drill a borehole. As an example, where automation can issue signals to one or more pieces of equipment, a controller can utilize a generated sequence or a portion thereof for automatic control. As explained, where a driller is involved in decision making and/or control, a generated sequence may facilitate drilling as the driller may rely on the generated sequence for making one or more adjustments to a drilling operation. Where one or more generated sequences are received in advance and/or in real-time, drilling operations can be performed more efficiently, for example, with respect to time to drill a section, a portion of a section, an entire borehole, etc. Such an approach may take equipment integrity (e.g., health, etc.) into consideration, for example, such an approach may account for risk of contact between a bit body and a formation and/or mud motor performance where a mud motor can be utilized to drive a bit.

Figure 6:
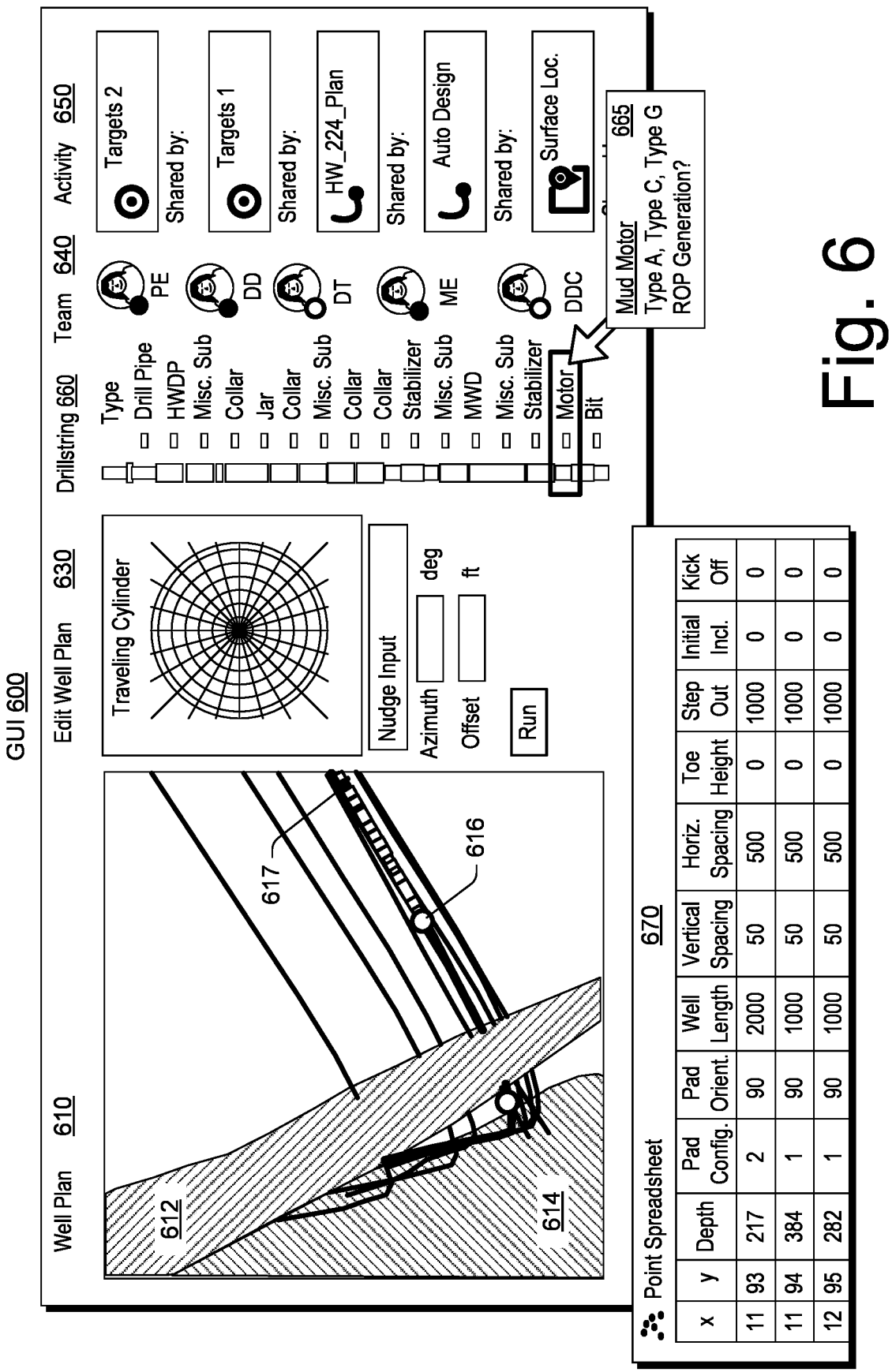
FIG. 6 illustrates an example of a graphical user interface.

FIG. 6 shows an example of a graphical user interface (GUI) 600 that includes information associated with a well plan. Specifically, the GUI 600 includes a panel 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650.

As shown in the example of FIG. 6, the GUI 600 can include a graphical control of a drillstring 660 where, for example, various portions of the drillstring 660 may be selected to expose one or more associated parameters (e.g., type of equipment, equipment specifications, operational history, etc.). In the example of FIG. 6, the drillstring graphical control 660 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

As an example, a workflow can include utilizing the graphical control of the drillstring 660 to select and/or expose information associated with a component or components such as, for example, a bit and/or a mud motor. As an example, in response to selection of a bit and/or a mud motor (e.g., consider a bit and mud motor combination), a computational framework (e.g., via a sequence engine, etc.) can generate one or more sequences, which may be utilized, for example, to operating drilling equipment in a particular mode (e.g., sliding mode, rotating mode, etc.). In the example of FIG. 6, a graphical control 665 is shown that can be rendered responsive to interaction with the graphical control of the drillstring 660, for example, to select a type of component and/or to generate one or more sequences, etc.

FIG. 6 also shows an example of a table 670 as a point spreadsheet that specifies information for a plurality of wells. As shown in the example table 670, coordinates such as "x" and "y" and "depth" can be specified for various features of the wells, which can include pad parameters, spacings, toe heights, step outs, initial inclinations, kick offs, etc.

Figure 7:
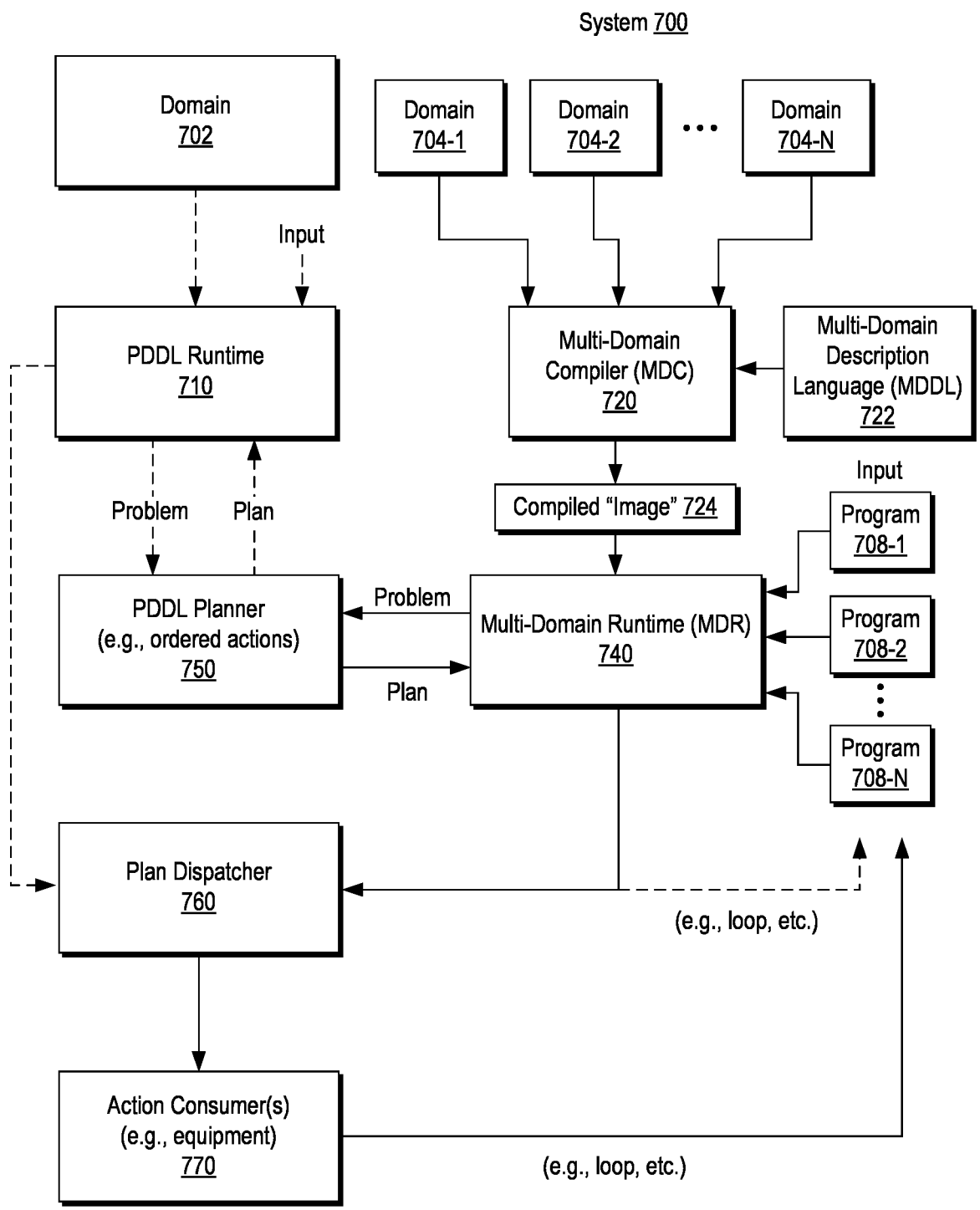
FIG. 7 illustrates an example of a system.

FIG. 7 shows an example of a system 700 that can provide services for multiple domains. In FIG. 7, features of a single domain approach are also shown, including a domain 702 and a planning domain definition language (PDDL) runtime 710, which may interact with various other features (see, e.g., dashed lines). In a single domain approach, a single domain is utilized to pose problems to a PDDL planner, which can, in response, generate a plan. A plan can include various actions that may be dispatched by a plan dispatcher 760. The PPDL runtime 710 may receive input where the PDDL runtime 710 is responsive to such input. For example, particular input may trigger the PDDL runtime 710 to output a problem to the PDDL planner 750. In the single domain approach shown, there is a one-to-one-to-one relationship between the domain 702, the PDDL runtime 710 and the PDDL planner 750. In such an approach, where a problem is complex, the PDDL planner may take a considerable amount of time to generate a plan, which may affect implementation in a real-time implementation and/or other type of time sensitive implementation.

As to services for multiple domains, the system 700 includes a multi-domain complier (MDC) 720 that can handle multiple domains 704-1, 704-2, . . . , 704-N through a multi-domain description language (MDDL) 722. In such an approach, two or more domains may be utilized where one or more types of relationships may exist for the two or more domains. For example, consider a parent and child relationship where a parent domain may aim to handle an overarching goal of a workflow and the child domain may aim to handle a discrete goal that is within the overarching goal such that the overarching goal depends on the discrete goal. In the context of drilling, an overarching goal may be to drill X feet to lengthen a borehole while a discrete goal may be to drill a stand where a stand is Y feet where Y feet is less than X feet. In such an example, the discrete goal may be expected to be performed a number of times such as, for example, $N_{dg}$ times where $N_{dg}$ may be calculated as X feet divided by Y feet. While the foregoing example mentions a single child, in various implementations, more than one child maybe present and, for example, one or more grandchildren may be present. Thus, a multiple domain approach may include tiered domains.

For example, the system 700 can provide services for a domain 702 and one or more additional domains 704-1, 704-2, . . . , 704-N. The system 700 can provide such services through implementation of a multi-domain compiler 720 and a multi-domain runtime 740.

In the JAVA language platform, the Java Runtime Environment (JRE) is a software container for various components executable to instantiate a JAVA virtual machine (VM or JVM) (e.g., using suitable computer hardware, etc.), which, in turn, can be utilized to run an application written in the JAVA language where the application may be packaged as a file with the "jar" extension (JAVA archive file or JAR file). A JRE can also include features such as various JAVA class libraries and the JAVA class loader. The JVM is responsible for ensuring that a JAVA application has the resources to run on a device, cloud environment, etc. As mentioned, a JAVA application can be in packaged as a JAR file that aggregates various JAVA class files and associated metadata and resources (e.g., text, images, etc.) into one file, which may be suitable for distribution.

As to a "runtime", it can refer to the runtime phase of execution of a program (e.g., an application). It may also refer to a runtime system that includes executable code and appropriate resources for execution of that executable code whereby the runtime system is in operation during the runtime phase.

As to a compiler, it can take information in one form and output it in another form. For example, a complier can be specified for a programming language to receive a source code file (e.g., written in the programming language) and output code suitable for execution in a runtime environment. For example, consider JAVA programming language source code that is transformed to JAVA class files including JAVA bytecode. In such an example, the JVM can translate the JAVA bytecode into native machine code. For example, the JVM can utilize its execution engine to read JAVA bytecode and executes it iteratively (e.g., for optimization, using an interpreter and a just-in-time (JIT) compiler to convert the bytecode to machine code for execution).

In the example of FIG. 7, the multi-domain compiler 720 can utilize one or more domains 704-1, 704-2, . . . , 704-N and the MDDL 722 to generate a compiled image 724 as an executable file that can be executed in a runtime environment as shown by the multi-domain runtime 740. The multi-domain runtime 740 is a live instance that can be suitable for receiving input, interacting with one or more planners, and generating output.

In the example of FIG. 7, the compiled image 724 includes multi-domain information suitable for a runtime phase where such information can formulate problems for submission to a planner such that the planner can generate corresponding plans in response. As an example, the compiled image 724 may be suitable for use in a runtime environment (e.g., a runtime system) where multiple planners may be available for reception of one or more problems and generation of one or more corresponding plans in response. As an example, where domains may be tiered, such as a parent domain with child domains, children problems may be handled in parallel where multiple planners are available. Such an approach can expedite runtime processes. For example, consider substantially simultaneously issuing problem A to planner 1 and problem B to planner 2 where planner 1 returns plan A and planner 2 returns plan B.

In the example of FIG. 7, the multi-domain complier 720 can perform various actions, which can include error checking, optimization, etc. As an example, the multi-domain compiler 720 can be utilized in a development phase that occurs prior to a runtime phase. As shown, the multi-domain compiler 720 can receive input from one or more domains 704-1, 704-2, . . . , 704-N and utilize the MDDL 722 to generate the complied image 724.

In the example of FIG. 7, the multi-domain runtime (MDR) 740 can execute the complied image 724 where various actions can occur responsive to and/or based on one or more inputs. In the example of FIG. 7, programs 708-1, 708-2, . . . , 708-N are shown as being capable of providing one or more inputs to the MDR 740. In such an example, input can be from a piece of equipment, a graphical user interface (GUI) rendered to a display of a device, etc. For example, consider a piece of equipment that includes a network interface that can transmit one or more types of information (e.g., data, status, alarm, etc.) to the MDR 740, which may, for example, cause the MDR 740 to formulate a problem and to transmit the problem to the PDDL planner 750, which can, for example, generate a plan and return the plan to the MDR 740. In such an example, the piece of equipment may be associated with one or more operations that aim to achieve a task, tasks, etc., which may be associated with one or more goals.

In an oilfield context, a piece of equipment may be a piece of rigsite equipment, which can include surface equipment and/or downhole equipment. For example, consider a rigsite system that includes surface equipment that is operatively coupled to downhole equipment (e.g., logging equipment, drilling equipment, fracturing equipment, perforation equipment, cementing equipment, artificial lift equipment, etc.). As an example, a system can be a drilling operations system, which can be operatively coupled to various types of equipment and may include and/or be operatively coupled to one or more components of the system 700 of FIG. 7.

As shown in the example of FIG. 7, the MDR 740 can be operatively coupled to the plan dispatcher 760 where, for example, during a runtime phase of the MDR 740 that involves execution of the complied image 724, optionally responsive to one or more inputs, the MDR 740 can issue one or more signals, commands, etc., that cause the plan dispatcher 760 to issue one or more signals, commands, etc., to one or more action consumers 770, which can include one or more pieces of equipment. In such an example, one or more of the action consumers 770 may be and/or be operatively coupled to one or more of the programs 708-1, 708-2, . . . , 708-N. For example, consider a mobile device that executes a program that can render a graphical user interface to a display of the mobile device that allows a user to cause transmission of an input to the MDR 740 and that can receive information, directly and/or indirectly, from the plan dispatcher 760. In such an example, a loop may exist between dispatched information from the MDR 740 (e.g., MDR output) and input to the MDR 740. Such a loop may include multiple action consumers of the one or more action consumers 770. As an example, an action consumer, a loop, etc., may be automated or semi-automated. For example, a semi-automated loop can include use of a device with a display and executable instructions for rendering a GUI or GUIs where human interaction with the device may cause an action to occur, may confirm occurrence of an action, may indicate non-occurrence of an action, may indicate that an issue exists, etc. Such types of interactions may generate input to the MDR 740, which as explained, can formulate a problem or problems suitable for transmission to one or more PDDL planners (e.g., in series, in parallel, etc.) where a problem or problems may relate to one or more domains (see, e.g., the domains 704-1, 704-2, . . . , 704-N).

As an example, the MDR 740, the plan dispatcher, the one or more action consumers 770, etc., may utilize a particular type or types of protocols. For example, consider use of uniform resource locators (URLs), which may include short and/or long URLs. Such types of output may be routed through one or more pieces of network equipment to one or more proper destinations (e.g., a piece of equipment as a destination, a mobile device as a destination, a database as a destination, etc.).

In the example of FIG. 7, the MDR 740 may operate in a manner that is contingent on input where, for example, a problem is triggered responsive to input. In such an example, the MDR 740 may be part of a control system (e.g., a controller, etc.) where input may be real-time input from equipment, etc. In such an example, time to output by the MDR 740 (e.g., to the plan dispatcher 760, to at least one of the one or more action consumers 770, etc.) may be reduced, particularly where a multiple domain approach is utilized. As explained, plan generation by the PDDL planner 750 (e.g., or PDDL planners) may be reduced where multiple domains are utilized, which can include parent, child, parents, children, grandparent, grandchild, grandparents, grandchildren, etc. As mentioned, domains may be tiered. As an example, one or more domains may be nested, for example, within a domain, between domains, etc. As explained, the MDDL 722 can provide for use of multiple domains such that the MDC 720 can generate the compiled image 724 as an executable for execution in a runtime phase as the MDR 740.

As an example, a workflow for multi-domain actions can include a compilation phase and a runtime phase. In such an example, the compilation phase can utilize the MDC 720 and the runtime phase can utilize the MDR 740 where, the MDR 740 may be, for example, utilized in an interactive process that aims to achieve one or more goals through various actions.

As an example, the system 700 can provide for multi-domain plan execution for one or more oilfield operations. For example, consider a well construction operation that aims to perform one or more operations for construction of a well in a subsurface environment. In such an example, the system 700 can provide for coordination of multiple PDDL plans from different domains in regard to automation of a well construction process.

As shown in the example of FIG. 7, the system 700 includes the MDDL 722, which can be a type of programming language that allows a PDDL domain author to construct and allow multiple PDDL domains to interact with each other. In such an approach, source code along with PDDL domain files can be input to the MDC 720 such that the MDC 720 can compile an image that can be loaded into the same framework, another instance of the same framework, another framework, etc., to be executed for real drilling operations. At runtime, a runtime environment can include and/or be operatively coupled to one or more sources for purposes of input. As mentioned, the MDR 740 may accept input from one or more other programs, frameworks, etc., and use the input to formulate one or more problems and/or to execute one or more PDDL plans. In such an example, execution of a plan can result in dispatching of one or more actions, for example, for equipment, programs, apps, etc., to execute.

As an example, the system 700 of FIG. 7 can handle multiple planning domains in a cohesive manner (e.g., unified manner, etc.), where, for example, the dispatched action of a domain may result in the plan for the execution of another domain. As explained, the system 700 may be tailored to the automation of oil field rig equipment and, for example, optionally one or more types of actions involving human interaction (e.g., via various human input devices (HIDs), etc.).

As indicated in FIG. 7, the system 700 can include one or more loops, which may be or include one or more feedback loops. For example, during performance of an action, which may be via one or more pieces of equipment, one or more sensors and/or other devices may generate signals and/or absence of signals that may be utilized by the system 700 as feedback that can be or inform one or more inputs of the MDR 740. In such an example, one or more types of automated or semi-automated control may be implemented for performance of one or more physical operations using one or more pieces of equipment, etc.

As an example, one or more portions of the system 700 may operate as a controller that can be a multi-domain controller. For example, the MDR can receive one or more types of input, which may depend on one or more types of feedback, such that the plan dispatcher 760 can dispatch one or more plans, revised plans, etc., to one or more of the action consumers 770, which, as mentioned, can include one or more pieces of equipment that can perform one or more physical operations (e.g., as to a physical task that may produce one or more products, condition one or more materials, alter one or more geologic structures, cause flow of one or more fluids, etc.). As an example, a borehole can be a product that is produced via drilling as a physical operation that breaks and removes rock from a formation. In such an example, the borehole may be utilized as a physical pathway for further drilling. As an example, a borehole may be utilized as a physical pathway for flow of fluid, movement of equipment, movement of material (e.g., rock, etc.), etc. As explained, in the oil and gas industry, a borehole can be formed that reaches a fluid reservoir where fluid may be produced from the reservoir via the borehole. In such an example, the borehole may be completed using various tubulars and materials (e.g., cement, etc.) to form a completed well.

As shown in the example of FIG. 7, the system 700 can include the MDC 720 and the MDR 740, which may be a single instance of a program that operates in two different modes (e.g., a compilation mode and a runtime mode), multiple instances of a program that operate in different modes, and/or multiple instances of specialized programs where a program can be specialized to operate in a compilation mode and a program can be specialized to operate in a runtime mode.

In the example of FIG. 7, the system 700 can include circuitry (e.g., hardware, software and hardware, etc.) that compiles and executes multiple PDDL planning domains for the automation of real time oil well construction operations. As an example, such an approach can include circuitry for recording, playback, and debugging facilities through multiple modes operations for coordination of multiple PDDL planning domains.

While a framework that includes features for instantiating the MDC 720 and MDR 740 can be targeted for oil field well construction, a framework may be applied to one or more other types of problems, which may include one or more other types of oil and gas automation problems. Various features, along with the MDDL 722 for coordinating multiple PDDL domains can facilitate rapid iteration of more complex domain models that can be demonstrated to non-technical personnel on how machine model behavior (e.g., artificial intelligence) will operate in production.

As an example, various features of the system 700 may be instantiated as an XPlan Operations Producer (XPOP) that can provide facilities to develop an arbitrary number of PDDL domains that can interact with each in order to be executed at a later timer where one or more other programs, devices, equipment, etc., can consume dispatched actions that are produced.

As an example, a domain author can construct several domains which may be related to each other in one or more ways. For example, consider a series of parent and child domains or one parent domain with multiple children domains that are independent of each other. With a parent-child relationship, an action in a parent domain can spawn a plan of a child domain when that action is dispatched, which can happen at runtime. As an example, one domain may rely on information from another domain in order to make progress in its proposed plan that was created by a PDDL planner. To facilitate this information sharing XPOP can provide in one or more manners appropriate syntax and logic. As shown in the example of FIG. 7, the system 700 includes the multi-domain description language (MDDL) 722, which can be or include a programming language that provides appropriate syntactical constructs that describe one or more types of relationships between domains.

FIG. 8 shows an example of code 800, which may be rendered to a display, for example, using a GUI or GUIs where a user may utilize a keyboard, a mouse, etc., to generate appropriate code, which may be automatically highlighted, checked, etc. (e.g., consider a program editor, etc.).

In the example of FIG. 8, the example of code 800 is shown to be a runtime code, which as mentioned, can be an error checked version, optimized version, etc. In the example of FIG. 8, a domain involves the act of baking bread where there are two available ovens and an arbitrary number of different types of bread dough that are to be baked. Before a single instance of dough can be baked it first demands mixing (e.g., consider a constraint of a single mixer) and a sufficient amount of time to rest before baking. In such an example, a PDDL planner can be used to solve the problem of (i) what dough is to be mixed and (ii) when it is to be baked (iii) in a specific oven in order to (iv) reduce a total amount of time to bake the various doughs. In such an example, note that (i), (ii) and (iii) would be part of a single problem in a single domain (e.g., viewed as a comprehensive single domain). In an XPOP approach, the "problem" can be multi-domain where XPOP can coordinate the multiple domains, can coordinate calls to the PDDL planner, and can coordinate how to dispatch results of derived plans. The example of FIG. 8 aims to also demonstrate how a framework that can implement the MDC 720 and the MDR 740 can be applied to non-oilfield operations (e.g., non-oilfield domains or a mix of oilfield and non-oilfield domains).

At the bottom of the code 800 of FIG. 8, there is an ':action-dispatch' clause that states for the mix-dough action from the bread domain, when it is dispatched, is to invoke the mix-bread action from the mixing domain. This serves as one example of various features provided by a runtime PDDL that an author can combine with PDDL domains where an XPOP approach can produce a compiled image that may be loaded into an XPOP framework (e.g., runtime environment) at a desired time, for example, in a production environment.

As explained, runtime environments exist for the JAVA ecosystem as well as for the .NET ecosystem that provide for respective runtime phases where a prior phase can be deemed a compilation phase. For example, a developer can write a program using JAVA where the program is compiled into a .jar file or using .NET where the program is compiled into an .exe file. In such examples, the .jar file can be executed using the JRE and the .exe file can be executed using the .NET runtime environment.

In the example of FIG. 7, where the compiled image 724 is to be utilized in a runtime phase as represented by the MDR 740, the MDR 740 may operate in a conditional manner. For example, it may not execute machine instructions directly from the compiled image 724; but rather, receive one or more external signals to begin a problem, call an external PDDL planner one or more times to receive a number of PDDL plans to execute, and then call for dispatching one or more corresponding actions of such plans, for example, using one or more of HTTP, RabbitMQ calls, API calls, etc., which may be executed upon from some external program. As an example, a MDR can be part of a control system (e.g., a controller, etc.) that responds to input where, depending on the input, may call for generation of a plan or plans, where such a plan or plans can include one or more actions that can be dispatched for purposes of control, etc.

As an example, a domain author may use the MDC 740 (e.g., an XPOP compiler) for interactive development of one or more of multiple domains.

Figure 9:
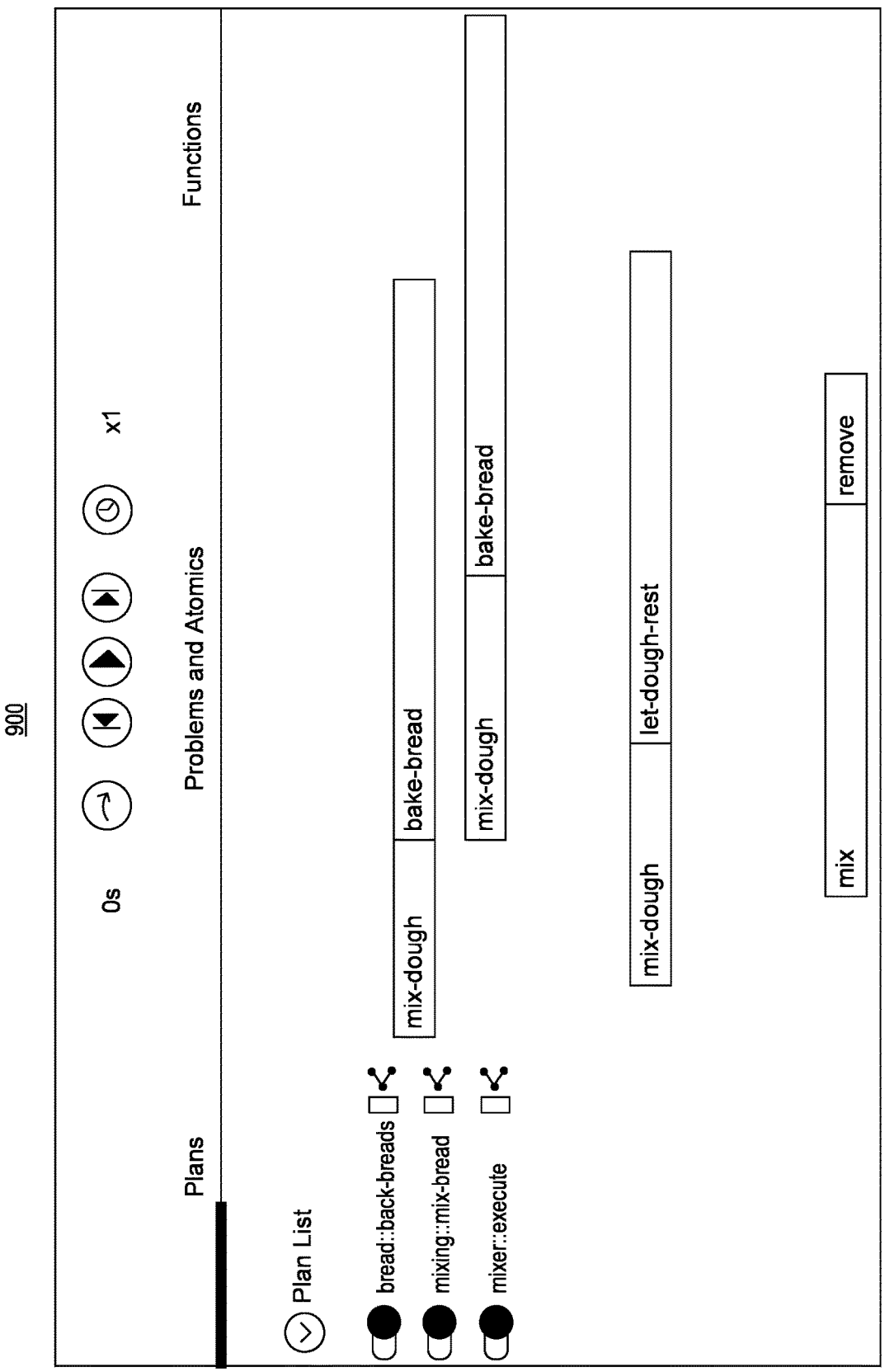
FIG. 9 illustrates an example of a graphical user interface (GUI)

FIG. 9 shows an example of a graphical user interface (GUI) 900 that includes a bread baking example with three different domains in play. For example, the GUI 900 can be a compiler development user interface for showing multiple PDDL domains that can be coordinated. As shown, the top-level domain contains a mix-dough action, highlighted in blue, that is currently being dispatched for execution. This action, however, is not intended to be executed by some external program or machinery but instead it is to instantiate a sub-problem of mix-dough which is the plan displayed below it. This new sub-problem contains a mix-dough action of its own which further expands into another sub-problem execute, which becomes the bottom-most plan containing two actions, mix and remove. The mix action is currently dispatched and as it does not include a child domain of its own it is dispatched to an external consumer for actual execution. In the example of FIG. 9, the relationships can be described in one or more runtime files, for example, using a MDDL such as the MDDL 722 of the system 722.

Being able to see example output of this multiple domain hierarchy is possible as the domain author may provide simulated inputs that may be received by a framework (e.g., multi-domain framework, XPOP framework, etc.) at runtime.

FIG. 10 shows examples of graphical user interfaces (GUIs) 1010 and 1030. In the examples of FIG. 10, simulated inputs are shown where an author can also see the output of their defined functions from a runtime file (e.g., a compiled image). In FIG. 10, the GUI 1010 includes various "atomic" factors such as altitude-factor, brick-oven, kitchen-oven, and mixer-on and the GUI 1030 includes various edits for a brick-oven (e.g., the brick-oven atomic), such as cleaning time, temperature, properties quality, properties max-temperature, etc. The example GUIs 1010 and 1030 can be development interface to enter simulated inputs.

FIG. 11 shows an example of a GUI 1100 where, for example, using another user interface tab, various outputs of the defined functions are shown, for example, corresponding to the simulated inputs as in FIG. 10. For example, the GUI 1100 can be used to render runtime PDDL output with simulated inputs.

In the examples of FIGS. 9, 10 and 11, various graphical control are shown such as a play control, a backwards control, and a forward control, which may be at the top of a GUI to allow for playback functionality, for example, as a user may simulate different inputs at different points of time.

As explained, a development phase can include implementing various features, which may be associated with a compiler. For example, once development is complete, a compiled image can be produced where the complied image can be utilized in a runtime phase, which may be contingent, responsive, etc., to one or more inputs. In such an example, where a framework includes a MDC and a MDR, a MDR can be instantiated for use in a runtime phase (e.g., a runtime mode, etc.) where the compiled image can be loaded and run.

As an example, a compiled image can include various components that can provide for runtime execution, for example, in an autonomous fashion. During runtime, a MDR may receive input from one or more external programs, devices, etc. Such input may be numerical for computation, may be in a natural language, may be a signal to begin a problem statement from a specific domain, etc. As an example, a runtime can be configured to accept input that is defined as allowable from runtime PDDL files (e.g., constructed earlier). For example, in FIG. 8, there is a problem named bake-breads under the bread domain that an external program can signal to begin. When a framework (e.g., MDR, etc.) receives such a problem signal at runtime, it can commence an appropriate dispatching process.

As shown in the example of FIG. 7, the MDR 740 can transmit a call to the PDDL planner 750 to create a plan, where the PDDL planner 750 may be within a framework common to the MDR 740 or separate. As an example, the PDDL planner 750 may be accessible via a network or networks. As mentioned, a MDR may be configured to transmit one or more calls to one or more PDDL planners (e.g., in series, in parallel, etc.).

As an example, a PDDL planner can be a program that receives a domain file that describes what is being modeled, which is the same PDDL domain that was authored during a development phase, along with a problem file that describes the current state of the world. As shown in the example of FIG. 7, the problem file can be generated by the MDR 740 (e.g., XPOP MDR, etc.) where the output generated is determined by various functions that were written in a runtime PDDL file. As an example, input can come from one or more external programs operating and serving such input at runtime. As an example, after a PDDL planner "finds" a suitable plan of actions to be executed, the plan can be utilized by the MDR for dispatch, for example, the MDR 740 may dispatch or may be operatively coupled to a dispatcher such as the plan dispatcher 760. As explained, a dispatched action or actions can be directed to one or more external consuming programs, devices, etc., which may be expected to execute such one or more actions, for example, based on semantic meaning.

As to an example within oil well construction, an action execution component may be expected to transform an action into one or more low-level instructions for hardware control. For example, a MDR may cause the dispatch an action named "turn off pumps" where it is expected that the action execution program transforms that into appropriate electrical signals to shut down mud-pumps on an oil rig.

Multi-domain planning, as explained, can improve various types of operations, which, as mentioned, can include real-time operations. As an example, multi-domain planning may provide for reuse, for example, at a development phase. As mentioned, multi-domain planning can provide for scenarios where actions of multiple domains are to occur simultaneously, in parallel, etc., where, for example, such actions may be part of corresponding plans where each plan may be responsive to a problem or problems and output by a PDDL planner or PDDL planners. In such an example, the problem or problems can be responsive to one or more inputs, which may be form one or more different programs, devices, etc.

As an example, in oilfield drilling operations, a well can be constructed by drilling a number of stands to reach a desired depth underground. In such an example, a stand may be composed of drill pipes coupled together such that the stand has a length of approximately 90 feet (e.g., approximately 30 meters). The stand itself can be connected to a drill string (e.g., making a connection) that includes a bottom hole assembly (BHA) with a drill bit at its end that can be rotated to drill through rock, etc. Once a stand is "drilled" (deepening a borehole by approximately 90 feet), the drill string, which includes various individual pieces of connected drill pipe, can be lifted off bottom ("off-bottom") and placed "in-slips" to suspend the drill string such that rig equipment can be utilized to lift and position a new stand. Once the new stand is connected to the drill string, the slips can be released (e.g., "out-of-slips"), the drill string rotated while lowering it in the borehole such that the drill bit goes "on-bottom" such that drilling continues to drill through rock to deepen the borehole. Drilling operations can also include various other actions such as, for example, drilling fluid related actions (e.g., mud pump actions, etc.), survey actions (e.g., taking a survey while "in-slips", etc.), etc. As such, stand-to-stand drilling may be interspersed with various types of actions, which may include actions not associated with moving, positioning, etc., drill pipe.

As an example, drilling a stand can involve various actions, for example, where mud pumps are turned on, a drill string that is "off-bottom" can be rotated and lowered until the drill bit touches the bottom of the borehole ("on-bottom") where drilling through rock continues. As mentioned, when drilling of the stand is completed, various actions can include halting rotation, lifting the drill bit off-bottom, going in-slips, turning off mud pumps, making a connection, going out-of-slips, turning on mud pumps, rotating, going on-bottom, etc.

Figure 12:
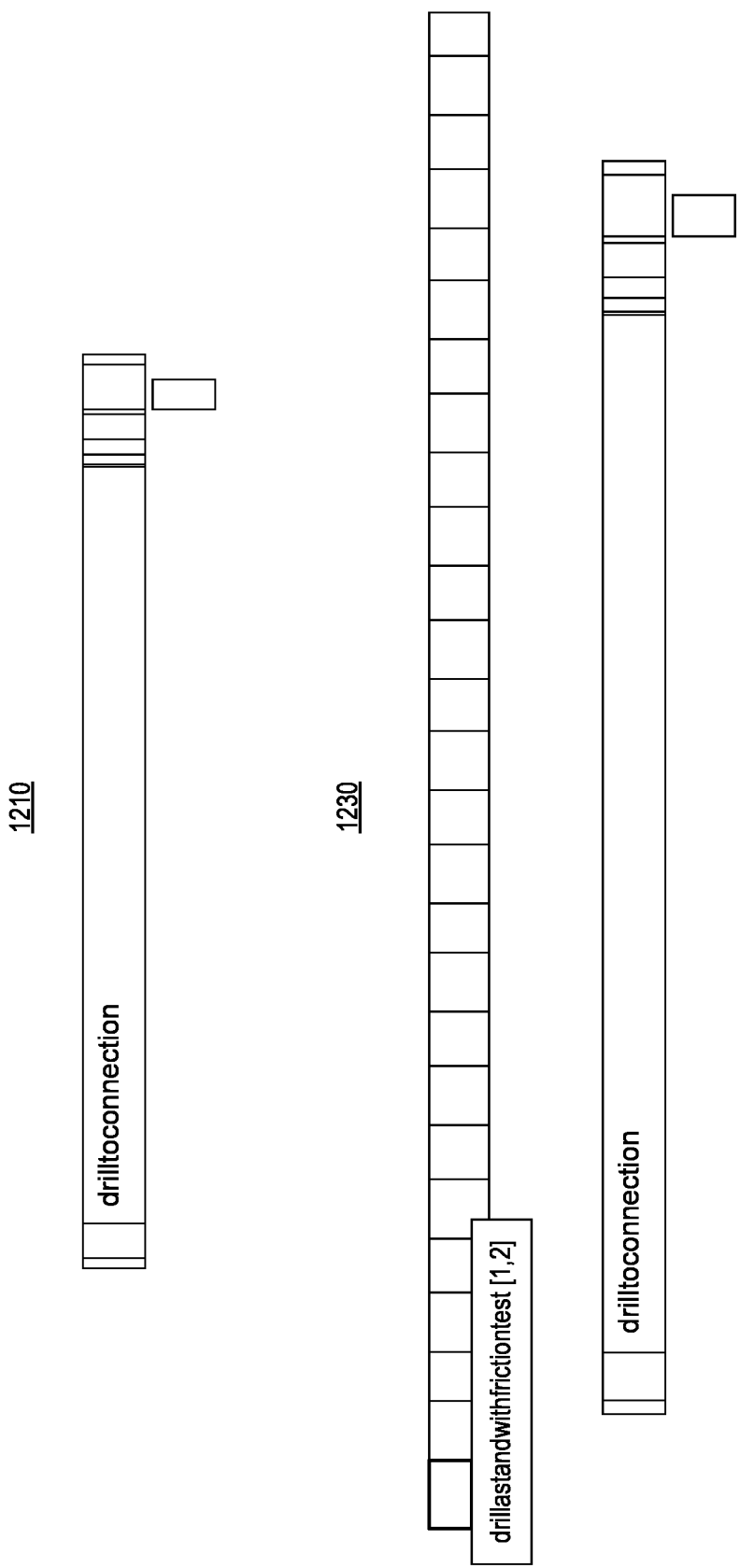
FIG. 12 illustrates examples of graphical user interfaces (GUIs)

FIG. 12 shows examples of GUIs 1210 and 1230 of a plan to drill a single stand where the dominate action is drillto-connection as that action can be an action that takes the most amount of time to complete. The GUI 1210 shows various graphics that can be segments where a width of a segment can correspond to an amount of time, for example, an amount of time expected to perform an action of a plan. As to the GUI 1230, it shows the graphics of the GUI 1210 along with graphics of an upper plan that is to drill to a specific depth and that includes actions, which, when executed, are to drill a single stand. As shown, the upper plan can include "drill a stand with friction test".

As an example, a PDDL planner may be provided with a problem and, in response, derive a plan within approximately 100 milliseconds (e.g., using a computer with adequate processing power and memory).

Thus, as an example, given a problem of drilling a stand, a plan can be generated to drill a stand. As an example, a workflow may aim to drill multiple stands such that a goal may be to create a plan where multiple stands are scheduled to be drilled. As mentioned, however, there can be one or more types of intermediate actions that may occur between stands (e.g., after drilling stand X and before drilling stand X+1), which may be pertinent to drilling operations. In such an example, the drilling PDDL domain can be configured to provide for such multiple stands and intermediate actions; however, in such a single domain approach, the PDDL planner is scheduling many actions and the time it takes to derive where multiple of these drill a stand plans are stitched together can take an exponential amount of time to the amount of feet to be drilled. For example, computing a plan to drill several hundred feet may take approximately half a second while computing a plan to drill several thousand feet may take minutes. The exponential increase in time can have a severe impact on usability and cost of drilling operations as an action that does not involve the physical act of drilling a well is considered non-productive time (NPT). Oilfield operations can involve continuous measurement of NPT and seek ways to reduce NPT. While a single domain approach may be suitable for generating a viable plan, the cost of doing so can confound real-time operation and make the approach impractical. In contrast, where plan time can be reduced, NPT may be reduced or not introduced. Additionally, details, domains, actions, etc., may be tailored in a manner that can provide for more optimal plans and hence operations, which can include real-time operations.

As an example, a multi-domain approach can utilize PDDL planning for drilling a well where the multiple domains can be strategically created. For example, consider one domain to schedule the number of stands to be drilled, along with any intermediate actions, and another domain to drill a stand.

In FIG. 12, as mentioned, the GUI 1230 shows an example where the upper plan is a series of actions to "drill to depth" and a highlighted blue action in that plan is to "drill a stand" (e.g., drill a single stand). In a trial workflow, a PDDL planner took approximately 100 milliseconds for the drill to depth plan and took another approximately 100 milliseconds for the child drill a stand plan. This example shows sequential planning but note that a parent plan may have two child plans running in parallel. In this scenario, a system such as the system 700 can plan both, for example, with two different instances of the PDDL planner to have them planned in parallel.

As explained, a multi-domain approach can coordinate this type of planning at runtime and can provide facilities for one or more types of corrective actions. For example, if the child plan in the GUI 1230 were to fail due to the user or rig machinery acting in such a way that deviates from the plan then a multi-domain approach can re-plan that child plan alone, which will include a new set of actions to still achieve the desired goal. In such an example, the re-planning can be performed without interrupting the execution of the parent plan; thus, minimizing the time demand to compute such plans. As explained, a multi-domain description language (MDDL) can be utilized to describe relationships between different PDDL domains (something a PDDL planner has no notion of).

FIG. 13 shows an example of code 1300 for a drill-to-depth PDDL domain while FIG. 14 shows an example of code 1400 for a corresponding runtime file (e.g., a component of a runtime file, etc.) that specifies that when either the drillAStand, drillLastStandToTargetDepth, drillAStandWithFrictionTest, or drillLastStandToTargetDepthWithFrictionTest actions are dispatched, that the MDR will call the PDDL planner again to plan a specific problem within the DrillAStand domain. For example, the MDDL 722 can be utilized by the MDC 720 to output the compiled image 724, which can include various components for the runtime phase as shown via the MDR 740, where, for example, one or more of the programs 708-1, 708-2, . . . , 708-N can provide input, optionally responsive to operation of the plan dispatcher 760, such that the MDR 740 calls the PDDL planner 750 to plan a specific problem within the DrillAStand domain (e.g., as one of the domains 704-1, 704-2, . . . , 704-N).

The example code 1300 of FIG. 13 is represented below, including headers with units, predicates and a listing of functions, noting that the listing below is less than 60 lines.

```
(define (domain DrillToDepth)
(:requirements :typing :durative-actions :fluents :duration-inequalities :negative-preconditions)
; UNITS; Distances are in meters; Durations are in minutes
(:predicates (atTarget) (drilledAStandDone) (offBottom))
(:functions
   (holeDepth)
   (connectionDepth)
   (targetDepth)
   (standLength)
   (drillingRop) ; average drilling ROP with making connection etc over head time included
   (frictionTestStandsFrequencyMinusOne) ; frequency of friction test minus one
   (standCountForFrictionTest)
)
(:durative-action drillAStand ; Drill until reach connection (aka until the end of the stand)
:parameters ( )
:duration (= ?duration (/ (- (connectionDepth) (holeDepth)) (drillingRop)))
:condition (and
   (at start (< (connectionDepth) (targetDepth)))
   (at start (< (standCountForFrictionTest) (frictionTestStandsFrequencyMinusOne)))
)
:effect (and
   (at end (assign (holeDepth)(connectionDepth)))
   (at end (assign (connectionDepth) (+ (connectionDepth) (+ (standLength) 2.6))))
   (at end (drilledAStandDone))
   (at end (assign (standCountForFrictionTest) (+ (standCountForFrictionTest) 1)))
)
)
```

```
(:durative-action drillAStandWithFrictionTest ; Drill until reach connection (aka until the end of the stand)
:parameters ( )
:duration (= ?duration (/ (- (connectionDepth) (holeDepth)) (drillingRop)))
:condition (and
    (at start (< (connectionDepth) (targetDepth)))
    (at start (= (standCountForFrictionTest) (frictionTestStandsFrequencyMinusOne)))
)
:effect (and
    (at end (assign (holeDepth)(connectionDepth)))
    (at end (assign (connectionDepth) (+ (connectionDepth) (standLength))))
    (at end (drilledAStandDone))
    (at start (assign (standCountForFrictionTest) O))
    )
)
(:durative-action drillLastStandToTargetDepth ; Drill until you reach the final target
:parameters ( )
:duration (= ?duration (/ (- (targetDepth) (holeDepth)) (drillingRop)))
:condition (and
    (at start (<= (targetDepth) (connectionDepth)))
    (at start (< (standCountForFrictionTest) (frictionTestStandsFrequencyMinusOne)))
    )
:effect (and
    (at end (atTarget))
    (at end (assign (holeDepth)(targetDepth)))
    (at end (offBottom))
    (at end (assign (standCountForFrictionTest) (+ (standCountForFrictionTest) 1)))
    )
)
```

The example code 1400 of FIG. 14 is represented below noting that the listing below is less than 60 lines.

```
;;;; run time file for drill to depth
(:runtime) ;;; start of every run time file
(:namespace (:domain DrillToDepth)
; functions and probem file definition
    (:function(atTarget)
        (DrillAStand::atTarget))
    (:function(offBottom)
        (DrillAStand::offBottom))
    (:function (standLength)
        (DrillAStand::standLength))
    (:function (targetDepth)
        (DrillAStand::targetDepth))
    (:function(drilledAStandDone)
        (or (window (DrillAStand::newStandConnected) :action drillAStand :end)
           (window (DrillAStand::newStandConnected) :action drillAStandWithFrictionTest :end)))
(:problem drill-to-depth
    :goal (atTarget)
    :init ((= (standCountForFrictionTest) 0))
    :time-unit minutes
    :dispatch-actor Automation
    :arbitration-level 0 ; Question: double check on this
    :arbitration-domains (DrillAStand))
(:action-dispatch drillAStand
    :sub-problem(DrillAStand::drill-a-stand :action-params)) ; Question: Need the last
(:action-dispatch drillLastStandToTargetDepth
    :sub-problem (DrillAStand::drill-last-stand-to-targetdepth :action-params))
(:action-dispatch drillAStandWithFrictionTest
    :sub-problem (DrillAStand::drill-a-stand :action-params))
(:action-dispatch drillLastStandToTargetDepthWithFrictionTest
    :sub-problem (DrillAStand::drill-last-stand-to-targetdepth :action-params))
) ; ; end namespace DrillToDepth
```

Figure 15:
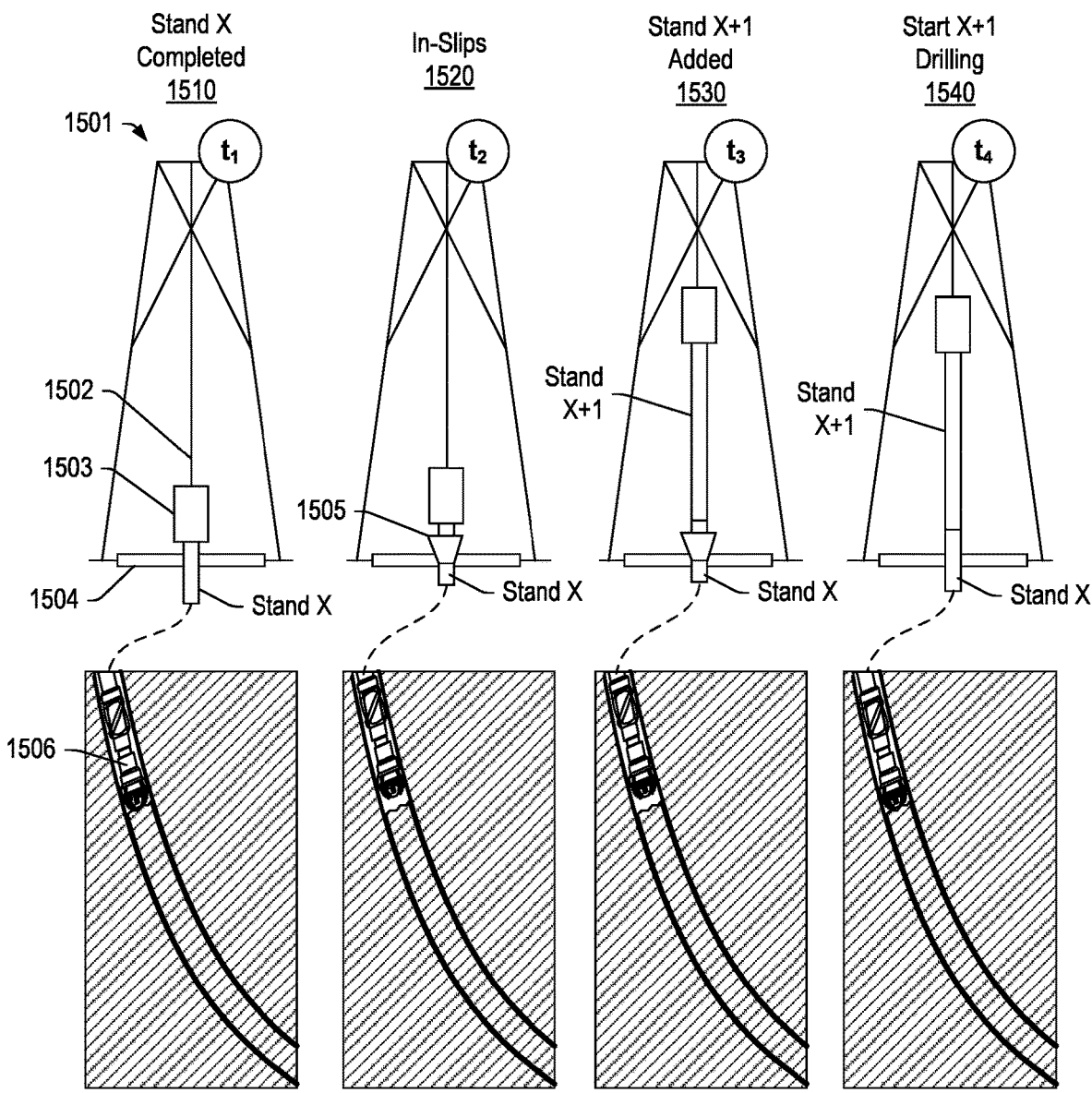
FIG. 15 illustrates an example of a method.

FIG. 15 shows an example of a method 1500 that utilizes drilling equipment to perform drilling operations. As an example, one or more actions of the drilling operations of the method 1500 may optionally be planned, for example, using a system such as the system 700 of FIG. 7.

As shown in FIG. 15, the drilling equipment includes a rig 1501, a lift system 1502, a block 1503, a platform 1504, slips 1505 and a bottom hole assembly 1506. As shown, the rig 1501 supports the lift system 1502, which provides for movement of the block 1503 above the platform 1504 where the slips 1505 may be utilized to support a drillstring that includes the bottom hole assembly 1506, which is shown as including a bit to drill into a formation to form a borehole.

As to the drilling operations, they include a first operation 1510 that completes a stand (Stand X) of the drillstring; a second operation 1520 that pulls the drillstring off the bottom of the borehole by moving the block 1503 upwardly and that supports the drillstring in the platform 1504 using the slips 1505; a third operation 1530 that adds a stand (Stand X+1) to the drillstring; and a fourth operation 1540 that removes the slips 1505 and that lowers the drillstring to the bottom of the borehole by moving the block 1503 downwardly. Various details of examples of equipment and examples of operations are also explained with respect to FIGS. 1, 2, 3, 4, 5 and 6.

As an example, drilling operations may utilize one or more types of equipment to drill, which can provide for various modes of drilling. As a borehole is deepened by drilling, as explained, stands can be added to a drillstring. A stand can be one or more sections of pipe; noting that a pipe-by-pipe or hybrid stand and pipe approach may be utilized.

In the example of FIG. 15, the operations 1510, 1520, 1530 and 1540 may take a period of time. For example, consider the amount of time it takes to position and connect a stand to another stand of a drillstring. A stand may be approximately 30 meters in length where precautions are taken to avoid detrimental contacting of the stand (metal or metal alloy) with other equipment or humans. During the period of time, one or more types of calculations, computations, communications, etc., may occur. For example, a driller may perform a depth of hole calculation based on a measured length of a stand, etc. As an example, a driller may analyze survey data as acquired by one or more downhole tools of a drillstring. Such survey data may help a driller to determine whether or not a planned or otherwise desired trajectory is being followed, which may help to inform the driller as to how drilling is to occur for an increase in borehole depth corresponding approximately to the length of the added stand.

As an example, where a top drive is utilized (e.g., consider the block 1503 as including a top drive), as the top drive approaches the platform 1504, rotation and circulation can be stopped and the drillstring lifted a distance off the bottom of the borehole. As the top drive is to be coupled to another stand, it is to be disconnected, which means that the drillstring is to be supported, which can be accomplished through use of the slips 1505. The slips 1505 can be set on a portion of the last stand (e.g., a pipe) to support the weight of the drillstring such that the top drive can be disconnected from the drillstring by operator(s), for example, using a top drive pipehandler. Once disconnected, the driller can then raise the top drive (e.g., the block 1503) to an appropriate level such as a fingerboard level, where another stand of pipe (e.g., approximately 30 m) can be delivered to a set of drill pipe elevators hanging from the top drive. The stand (e.g., Stand X+1) can be raised and stabbed into the drillstring. The top drive can then be lowered until its drive stem engages an upper connection of the stand (e.g., Stand X+1). The top drive motor can be engaged to rotate the drive stem such that upper and lower connections of the stand are made up relatively simultaneously. In such an example, a backup tong may be used at the platform 1504 (e.g., drill floor) to prevent rotation of the drillstring as the connections are being made. After the connections are properly made up, the slips 1505 can be released (e.g., out-of-slips). Circulation of drilling fluid (e.g., mud) can commence (e.g., resume) and, once the bit of the bottom hole assembly 1506 contacts the bottom of the borehole, the top drive can be utilized for drilling to deepen the borehole. The entire process, from the time the slips are set on the drillstring (e.g., in-slips), a new stand is added, the connections are made up, and the slips are released (e.g., out-of-slips), allowing drilling to resume, can take on the order of tens of seconds to minutes, generally less than 10 minutes where operations are normal and as expected.

As to the aforementioned top drive approach, the process of adding a new stand of pipe to the drillstring, and drilling down to the platform (e.g., the floor), can involve fewer actions and demand less involvement from a drill crew when compared to kelly drilling (e.g., rotary table drilling). Drillers and rig crews can become relatively proficient in drilling with top drives. Built-in features such as thread compensation, remote-controlled valves to stop the flow of drilling fluids, and mechanisms to tilt the elevators and links to the derrickman or floor crew can add to speed, convenience and safety associated with top drive drilling.

As an example, a top drive can be utilized when drilling with single joints (e.g., 10 m lengths) of pipe, although greater benefit may be achieved by drilling with triples (e.g., stands of pipe). As explained, with the drill pipe being supported and rotated from the top, an entire stand of drill pipe can be drilled down at one time. Such an approach can extend the time the bit is on bottom and can help to produce a cleaner borehole. Compared to kelly drilling, where a connection is made after drilling down a single joint of pipe, top drive drilling can result in faster drilling by reducing demand for two out of three connections.

As mentioned, a well can be a direction well, which is constructed using directional drilling. Directional wells have been a boon to oil and gas production, particularly in unconventional plays, where horizontal and extended-reach wells can help to maximize wellbore exposure through productive zones.

One or more of various technologies can be utilized for directional drilling. For example, consider a steerable mud motor that can be utilized to achieve a desired borehole trajectory to and/or through one or more target zones. As an example, a directional drilling operation can use a downhole mud motor when they kick off the well, build angle, drill tangent sections and maintain trajectory.

A mud motor can include a bend in a motor bearing housing that provides for steering a bit toward a desired target. A bend can be surface adjustable (e.g., a surface adjustable bend (SAB)) and, for example, set at an angle in a range of operational angles (e.g., consider 0 degrees to approximate 5 degrees, 0 degrees to approximately 4 degrees, 0 degrees to approximately 3 degrees, etc.). The bend can aim to be sufficient for pointing the bit in a given direction while being small enough to permit rotation of the entire mud motor assembly during rotary drilling. The deflection cause by a bend can be a factor that determines a rate at which a mud motor can build angle to construct a desired borehole. By orienting the bend in a specific direction, referred to as a toolface angle, a drilling operation can change the inclination and azimuth of a borehole trajectory. To maintain the orientation of the bend, the drillstring is operated in a sliding mode where the entire drillstring itself does not rotate in the borehole (e.g., via a top drive, a rotary table, etc.) and where bit rotation for drilling is driven by a mud motor of the drillstring.

A mud motor is a type of positive displacement motor (PDM) powered by drilling fluid. As an example, a mud motor can include an eccentric helical rotor and stator assembly drive. As drilling fluid (e.g., mud) is pumped downhole, the drilling fluid flows through the stator and turns the rotor. The mud motor converts hydraulic power to mechanical power to turn a drive shaft that causes a bit operatively coupled to the mud motor to rotate.

Through use of a mud motor, a directional drilling operation can alternate between rotating and sliding modes of drilling. In the rotating mode, a rotary table or top drive is operated to rotate an entire drillstring to transmit power to a bit. As mentioned, the rotating mode can include combined rotation via surface equipment and via a downhole mud motor. In the rotating mode, rotation enables a bend in the motor bearing housing to be directed equally across directions and thus maintain a straight drilling path. As an example, one or more measurement-while-drilling (MWD) tools integrated into a drillstring can provide real-time inclination and azimuth measurements. Such measurements may be utilized to alert a driller, a controller, etc., to one or more deviations from a desired trajectory (e.g., a planned trajectory, etc.). To adjust for a deviation or to alter a trajectory, a drilling operation can switch from the rotating mode to the sliding mode. As mentioned, in the sliding mode, the drillstring is not rotated; rather, a downhole motor turns the bit and the borehole is drilled in the direction the bit is point, which is controlled by a motor toolface orientation. Upon adjustment of course and reestablishing a desired trajectory that aims to hit a target (or targets), a drilling operation may transition from the sliding mode to the rotating mode, which, as mentioned, can be a combined surface and downhole rotating mode.

Of the two modes, slide drilling of the sliding mode tends to be less efficient; hence, lateral reach can come at the expense of penetration rate. The rate of penetration (ROP) achieved using a sliding technique tends to be approximately 10 percent to 25 percent of that attainable using a rotating technique. For example, when a mud motor is operated in the sliding mode, axial drag force in a curve portion and/or in a lateral portion acts to reduce the impact of surface weight such that surface weight is not effectively transferred downhole to a bit, which can lead to a lower penetration rate and lower drilling efficiency.

Various types of automated systems (e.g., auto drillers) may aim to help a drilling operation to achieve gains in horizontal reach with noticeably faster rates of penetration.

When transitioning from the rotating mode to the sliding mode, a drilling operation can halt rotation of a drillstring and initiate a slide by orienting a bit to drill, for example, in alignment with a trajectory proposed in a well plan. As to halting rotation of a drillstring, consider, as an example, a drilling operation that pulls a bit off-bottom and reciprocates drillpipe to release torque that has built up within the drillstring. The drilling operation can then orient a downhole mud motor using real-time MWD toolface measurements to ensure the specified borehole deviation is obtained. Following this relatively time-consuming orientation process, the drilling operation can set a top drive brake to prevent further rotation from the surface. In such an example, a sliding drilling operation can begin as the drilling operation eases off a drawworks brake to control hook load, which, in turn, affects the magnitude of weight imposed at the bit (e.g., WOB). As an example, minor right and left torque adjustments (e.g., clockwise and counter-clockwise) may be applied manually to steer the bit as appropriate to keep the trajectory on course.

As the depth or lateral reach increases, a drillstring tends to be subjected to greater friction and drag. These forces, in turn, affect ability to transfer weight to the bit (e.g., WOB) and control toolface orientation while sliding, which may make it more difficult to attain sufficient ROP and maintain a desired trajectory to a target (or targets). Such issues can result in increased drilling time, which may adversely impact project economics and ultimately limit length of a lateral section of a borehole and hence a lateral section of a completed well (e.g., a producing well).

The capability to transfer weight to a bit affects several aspects of directional drilling. As an example, a drilling operation can transfers weight to a bit by easing, or slacking off, a brake, which can transfer some of the hook load, or drillstring weight, to the bit. The difference between the weight imposed at the bit and the amount of weight made available by easing the brake at the surface is primarily caused by drag. As a horizontal departure of a borehole increases, longitudinal drag of the drillpipe along the borehole tends to increase.

Controlling weight at the bit throughout the sliding mode can be made more difficult by drillstring elasticity, which permits the pipe to move nonproportionally. Such elasticity can cause one segment of drillstring to move while other segments remain stationary or move at different velocities. Conditions such as, for example, poor hole cleaning may also affect weight transfer. In the sliding mode, hole cleaning tends to be less efficient because of a lack of pipe rotation; noting that pipe rotation facilitates turbulent flow in the annulus between the pipe (drillstring pipe or stands) and the borehole and/or cased section(s). Poor hole cleaning is associated with ability to carry solids (e.g., crushed rock) in drilling fluid (e.g., mud). As solids accumulate on the low side of a borehole due to gravity, the cross-sectional area of the borehole can decrease and cause an increase in friction on a drillstring (e.g., pipe or stands), which can make it more difficult to maintain a desired weight on bit (WOB), which may be a desired constant WOB. As an example, poor hole cleaning may give rise to an increased risk of sticking (e.g., stuck pipe).

Differences in frictional forces between a drillstring inside of casing versus that in open hole can cause weight to be released suddenly, as can hang-ups caused by key seats and ledges. A sudden transfer of weight to the bit that exceeds a downhole motor's capacity may cause bit rotation to abruptly halt and the motor to stall. Frequent stalling can damage the stator component of a mud motor, depending on the amount of the weight transferred. A drilling operation can aim to operate a mud motor within a relatively narrow load range in an effort to maintain an acceptable ROP without stalling.

As an example, a system can include a console, which can include one or more displays that can render one or more graphical user interfaces (GUIs) that include data from one or more sensors. As an example, an impending stall might be indicated by an increase in WOB as rendered to a GUI, for example, with no corresponding upsurge in downhole pressure to signal that an increase in downhole WOB has actually occurred. In such an example, at some point, the WOB indicator may show an abrupt decrease, indicating a sudden transfer of force from the drillstring to the bit. Increases in drag impede an ability to remove torque downhole, making it more difficult to set and maintain toolface orientation.

Toolface orientation can be affected by torque and WOB. When weight is applied to the bit, torque at the bit tends to increase. As mentioned, torque can be transmitted downhole through a drillstring, which is operated generally for drilling by turning to the right, in a clockwise direction. As weight is applied to the bit, reactive torque, acting in the opposite direction, can develop. Such left-hand torque (e.g., bit reaction torque in a counter-clockwise direction) tends to twist the drillstring due to the elastic flexibility of drillstring in torsional direction. In such conditions, the motor toolface angle can rotate with the twist of drillstring. A drilling operation can consider the twist angle due to reactive torque when the drilling operation tries to orient the toolface of a mud motor from the surface. Reactive torque tends to build as weight is increased, for example, reaching its maximum value when a mud motor stalls. As an example, reactive torque can be taken into account as a drilling operation tries to orient a mud motor from the surface. In practice, a drilling operation may act to make minor shifts in toolface orientation by changing downhole WOB, which alters the reactive torque. To produce larger changes, the drilling operation may act to lift a bit off-bottom and reorient the toolface. However, even after the specified toolface orientation is achieved, maintaining that orientation can be at times challenging. As mentioned, longitudinal drag tends to increases with lateral reach, and weight transfer to the bit can become more erratic along the length of a horizontal section, thus allowing reactive torque to build and consequently change the toolface angle. The effort and time spent on orienting the toolface can adversely impact productive time on the rig.

As explained, directional drilling can involve operating in the rotating mode and operating in the sliding mode where multiple transitions can be made between these two modes. As mentioned, drilling fluid can be utilized to drive a downhole mud motor and hence rotate a bit in a sliding mode while surface equipment can be utilized to rotate an entire drillstring in a rotating mode (e.g., a rotary table, a top drive, etc.), optionally in combination with drilling fluid being utilized to drive a downhole mud motor (e.g., a combined rotating mode). Directional drilling operations can depend on various factors, including operational parameters that can be at least to some extent controllable. For example, one or more factors such as mode transitions, lifting, WOB, RPM, torque, and drilling fluid flow rate can be controllable during a drilling operation.

As mentioned, construction of a well can include various operations, processes, etc. As explained, such operations may be defined using multiple domains. As an example, domains may include domains for different modes of drilling, for example, consider a sliding domain for a sliding mode and a rotating domain for a rotating mode. As an example, a system such as, for example, the system 700 of FIG. 7, may be utilized for multi-domain planning, plan generation and plan execution, optionally with re-planning.

As an example, a framework can utilize a Representational State Transfer (REST) API, which is of a style that defines a set of constraints to be used for creating web services. Web services that conform to the REST architectural style, termed RESTful web services, provide interoperability between computer systems on the Internet. RESTful web services can allow one or more requesting systems to access and manipulate textual representations of web resources by using a uniform and predefined set of stateless operations. One or more other kinds of web services may be utilized (e.g., such as SOAP web services) that may expose their own sets of operations.

As an example, a computational controller operatively coupled to equipment at a rigsite (e.g., a wellsite, etc.) can utilize one or more APIs to interact with a computational framework that includes one or more features of a system such as, for example, the system 700 of FIG. 7. In such an example, one or more calls may be made where, in response, one or more actions are provided (e.g., control actions for drilling, etc.). In such an example, an action may be transmitted and utilized by a controller to control drilling at a rigsite.

FIG. 16 shows an example of a method 1600 that includes an issuance block 1610 for, in a runtime environment of compiled multi-domain code for multiple different domains that describe physical operations (e.g., consider one or more physical operations that can be performed using one or more pieces of equipment), responsive to input, issuing a call to a planning domain definition language (PDDL) planner; a reception block 1620 for, responsive to the call, receiving a plan that includes at least one action; and a dispatch block 1630 for dispatching at least one of the at least one action to call for performance of at least a portion of at least one of the physical operations.

The method 1600 is shown as including various computer-readable storage medium (CRM) blocks 1611, 1621 and 1631 that can include processor-executable instructions that can instruct a computing system, which can be a control system, to perform one or more of the actions described with respect to the method 2900.

In the example of FIG. 16, the system 1690 includes one or more information storage devices 1691, one or more computers 1692, one or more networks 1695 and instructions 1696. As to the one or more computers 1692, each computer may include one or more processors (e.g., or processing cores) 1693 and memory 1694 for storing the instructions 1696, for example, executable by at least one of the one or more processors 1693 (see, e.g., the blocks 1611, 1621 and 1631). As an example, a computer may include one or more network interfaces (e.g., wired or wireless), one or more graphics cards, a display interface (e.g., wired or wireless), etc.

Figure 17:
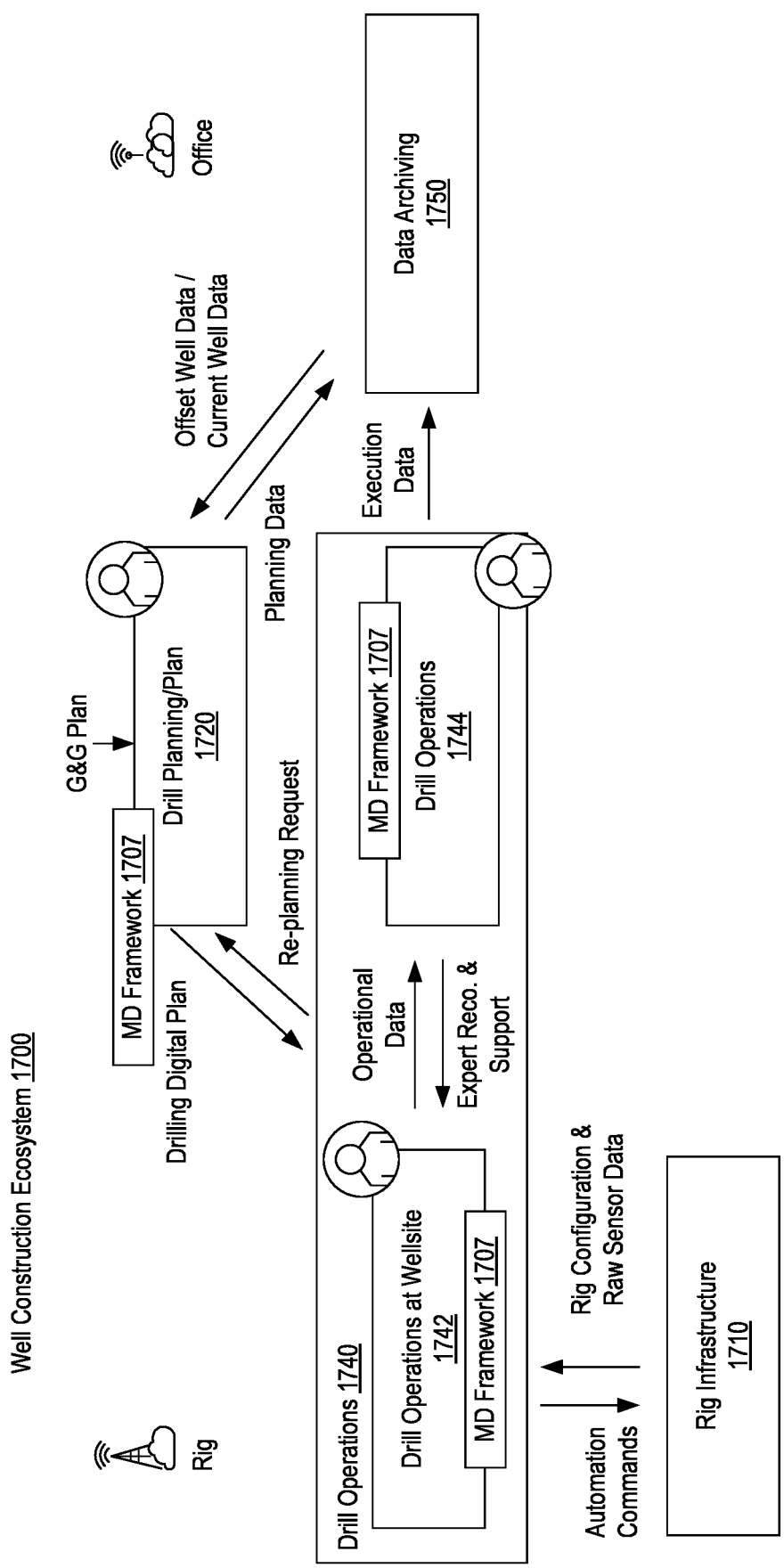
FIG. 17 illustrates an example of a system.

FIG. 17 shows an example of a system 1700 that can be a well construction ecosystem that can include one or more instances of a multi-domain framework 1707. Such a framework can compile multi-domain code for multiple different domains that describe physical operations that can be, for example, performed using equipment, and establish a runtime environment of compiled multi-domain code where, for example, responsive to input, the framework can issue a call to a planning domain definition language (PDDL) planner that, in response to the call, can generate a plan where the plan can be received by the framework; noting that a framework may include one or more PDDL planners. Such a plan can include one or more actions where a framework may dispatch such one or more actions, for example, to call for performance of at least a portion of at least one physical operation. As an example, the multi-domain framework 1707 can include one or more features of the system 700 of FIG. 7.

As an example, the system 700 and/or the system 1700 may include one or more features of the DELFI environment and/or be operatively coupled to one or more features of the DELFI environment.

As shown, the system 1700 can include one or more instances of the MD framework 1707 and can include a rig infrastructure 1710 and a drill plan component 1720 that can generation or otherwise transmit information associated with a plan to be executed utilizing the rig infrastructure 1710, for example, via a drilling operations layer 1740, which includes a wellsite component 1742 and an offsite component 1744. As shown, data acquired and/or generated by the drilling operations layer 1740 can be transmitted to a data archiving component 1750, which may be utilized, for example, for purposes of planning one or more operations (e.g., per the drilling plan component 1720).

In the example of FIG. 17, the MD framework 1707 is shown as being implemented with respect to the drill plan component 1720, the wellsite component 1742 and/or the offsite component 1744.

As an example, the MD framework 1707 can interact with one or more of the components in the system 1700. As shown, the MD framework 1707 can be utilized in conjunction with the drill plan component 1720. In such an example, data accessed from the data archiving component 1750 may be utilized to assess output of the MD framework 1707 or, for example, may be utilized as input to the MD framework. As an example, the data archiving component 1750 can include drilling data for one or more offset wells and/or one or more current wells pertaining to specifications for and/or operations of one or more types of bits, one or more types of mud motors, etc. As an example, data may be utilized in combination with a framework such as, for example, the IDEAS framework (Schlumberger Limited, Houston, Texas).

The IDEAS integrated dynamic design and analysis framework can provide 4D simulations of a drillstring and wellbore geometry to help ensure accurate modeling for drilling and/or milling applications. Such a dynamic modeling system can generate data, simulations, etc., that can show interactions in a virtual environment that represents an actual environment, which may help to customize material and design in real time, optionally assisting with real time operations in the field. For example, consider features that help to predict bit and mill performance while reducing demand for costly trial-and-error field tests. In such an example, a drilling operation may be performed in a manner that is more likely to achieve a desire result on a first run. As explained, the IDEAS framework may be integrated into a system such as, for example, the system 700 of FIG. 7. In such an example, feedback from one or more physical operations may be utilized to update, revise, etc., one or more framework runs where framework output can be utilized by a MDR for purposes of plan output (e.g., where a plan can be consumed at least in part by one or more entities for performance of one or more physical operations).

As an example, an IDEAS framework can be implemented in a manner where models are verified and validated using one or more of various techniques (e.g., theoretical calculations, finite element packages, in-house drill rig tests, full-scale rig tests, and field tests with MWD or downhole drilling dynamics sensors, etc.). As an example, an IDEAS framework implementation can include model revisions and/or updates that may be subjected to verification and/or validation. In such an example, the IDEAS framework may dynamically learn and/or revise itself for purposes of generating output for one or more projects, which may be controlled at least in part using output of a MDR.

As shown in FIG. 17, various components of the drilling operations layer 1740 may utilize the multi-domain (MD) framework 1707 and/or a drilling digital plan as output by the drill plan component 1720 (e.g., a PDDL planner plan, etc.). During drilling, execution data can be acquired, which may be utilized by the MD framework 1707, for example, to update one or more plans, actions, etc. Such execution data can be archived in the data archiving component 1750, which may be archived during one or more drill operations and may be available by the drill plan component 1720, for example, for re-planning, etc.

As an example, a plan can be a digital plan that can instruct one or more pieces of equipment, which may be operatively coupled via a network and/or other communication system. In such an example, a piece of equipment may include an embedded controller or otherwise dedicated controller that can operate at least in part using a digital plan. In such an example, the digital plan may be updated, revised, etc., which may depend on an overall plan, as may be measured using various types of sensor data. For example, where drilling encounters particular conditions that may differ from those expected during plan generation, feedback may cause automatic generation of a digital plan that can account for such particular conditions. In such an example, the digital plan may be distributed and/or actions thereof issued to appropriate equipment to control one or more aspects of physical operations. Where an embedded controller is utilized, as an example, a new digital plan may be transmitted for instantiation in the embedded controller where a prior digital plan may be purged (e.g., or stored to memory dedicated for storage of plans not currently being implemented). As an example, an embedded controller may utilize one or more types of architectures, for example, consider the ARM (e.g., an advanced reduced instruction set computing (RISC) architecture), which may be suitable for a system-on-chip (SoC), a system-on-module (SoM), etc., embedded structure. As an example, at a site, a system may be an Internet-of-Things (IoT) type of system where one or more of the IoTs can operate at least in part via a digital plan as may be generated via an MDR, etc.

As an example, a system may be implemented locally and/or remotely. For example, consider a cloud-based platform that can execute various portions of the system 700 of FIG. 7, which may include one or more instances thereof for purposes of dispatching one or more digital plans and/or issuance of plan actions to one or more plan consumers. In such an example, a site system may include one or more pieces of equipment that can operate in a coordinated manner, which may include synchronous and/or asynchronous operations. As an example, in such a site system, one or more types of resources may be limited and/or otherwise constrained (e.g., people, power, particular tools, etc.).

As an example, a coordinated approach to performance of one or more physical operations may account for one or more limitations, constraints, etc. For example, consider the example of one or more types of bread being baked using one or more recipes and/or one or more ovens where materials, ovens, people, etc., may be limited or otherwise constrained. In such an example, where multiple ovens are available, energy consumption may be considered as a constraint. For example, if the ovens are electric and consume a known amount of electrical power, a constraint may be in place to keep peak electrical power below a maximum value, which may related to infrastructure. Such an approach, which looks beyond the specifics of an operation, may be considered a "systems" approach. In such an example, a "system" may be defined as a cohesive group of interrelated and interdependent parts which can include natural, human-made and/or human parts where the "system" may be bounded by space and time and, for example, influenced by its environment. A "system" may be defined by its structure and purpose, and expressed through its functioning. In various instances, a "system" may expresses synergy or emergent behavior, which may be more than a "sum of its parts" approach.

In the context of various field operations (e.g., drilling operations, hydraulic fracturing operations, seismic survey operations, etc.), which may be interrelated, planning may take a "systems" approach such that plans and/or portions of plans are generated, implemented, revised, etc., in a manner that accounts for one or more limitations and/or constraints and/or that allows for expression of synergy and/or emergence. Emergence can exist in a complex system; for example, consider life as being an emergent behavior of chemistry. As an example, consider interrelationships between a hydraulic fracturing operation that pumps fluid into the ground to fracture rock and microseismic sensing that aims to record sonic energy caused by fracturing of rock where the microseismic sensing can be utilized in a control loop to improve the hydraulic fracturing operation, which may improve it in real time or near real time. In such an example, multiple domains may be integrated through a multi-domain complier where a multi-domain runtime may generate output for one or more plans that can control an interrelated and complex system, which may be limited and/or constrained in one or more manners (e.g. pump rate, pump pressure, amount of proppant, density of microseismic sensor array, etc.).

As an example, a system can provide for compiling and executing multiple PDDL planning domains for automation of one or more real time oil and/or gas physical operations, which include equipment and which can include one or more human operators. As an example, a system may provide recording, playback, and debugging facilities through multiple modes in construction of coordinating multiple PDDL planning domains.

As an example, a framework can be a multi-domain framework. Such a framework can be suitable for oil and/or gas field operations and may provide solutions to automation problems via one or more interfaces (e.g. GUIs, etc.). As an example, various features, along with special language for coordinating multiple PDDL domains, can facilitate rapid iteration of more complex domain models that can be demonstrated to personnel (e.g., non-technical personnel, etc.) as to how artificial intelligence behavior can be implemented in the field.

As explained, a system can utilize a programming language that allows a PDDL domain author to construct and allow multiple PDDL domains to interact with each other. Such a system can utilize source code along with PDDL domain files and compile to an image where the image may be loaded into a program to be executed for instructing real field operations (e.g., drilling, fracturing, sensing, etc.). In such an example, at runtime a program may accept input from one or more other programs (e.g., frameworks, etc.) and use such input to execute one or more PDDL plans, which can result in the program to dispatch actions, which can include actions that one or more other programs may execute. As explained, a system may operate in a networked environment where one or more pieces of equipment can include control capabilities and/or be operatively coupled to one or more controllers that can be instructed via one or more actions specified by a digital plan or digital plans.

As an example, a method can include, in a runtime environment of compiled multi-domain code for multiple different domains that describe physical operations (e.g., physical operations performed at least in part using equipment), responsive to input, issuing a call to a planning domain definition language (PDDL) planner; responsive to the call, receiving a plan that includes at least one action; and dispatching at least one of the at least one action to call for performance of at least a portion of at least one of the physical operations. In such an example, the multiple different domains can include at least one relationship. For example, the at least one relationship can include a parent-child relationship between a parent domain and a child domain. In such an example, a plan can be a parent plan of the parent domain that includes multiple instances of a child plan of the child domain (e.g., calls for child plan implementation, etc.). As an example, a child plan can include actions to drill a length of a borehole and a parent plan can include actions to drill a multiple of the length (e.g., multiple calls for child plan implementation, etc.).

As an example, multiple different domains can include at least two tiers. As an example, a tier may be a parent to a child or a child to a parent or another type of relationship.

As an example, a plan may correspond to one of multiple different domains.

As an example, a method can include, responsive to input, issuing multiple calls to multiple planning domain definition language (PDDL) planners. In such an example, the method can include, responsive to each call, receiving a respective plan. As an example, a PDDL planner and another PDDL planner can be separate instances of the same PDDL planner or, for example, a PDDL planner and another PDDL planner can be instances of different PDDL planners.

As an example, a method can include generating a compiled multi-domain code using a multi-domain description language, where at least one relationship between two of multiple different domains is described using the multi-domain description language.

As an example, a method can include providing a framework, where a runtime environment is implemented using the framework in a runtime mode where the framework is operable in a development mode for generating compiled multi-domain code.

As an example, physical operations described by multiple different domains can include at least one oilfield operation. For example, consider physical operations that include at least one drilling operation.

As an example, a method can include receiving input from an executing program on a computing device where the input is received in a runtime environment of compiled multi-domain code and where the input triggers issuing a call or calls to one or more PDDL planners. In such an example, one or more plans can be returned where, for example, dispatching can include dispatching at least one action of at least one of the one or more plans.

As an example, input may be received from a computing device executing a program and dispatching may dispatch to that computing device or otherwise to the executing program (e.g., in a distributed computing system, etc.). As an example, a piece of equipment can include one or more processors and thus be a computing device. As an example, a computing device or a computing system can be a controller (e.g., or control system, etc.). As an example, a method can include dispatching at least one action of a plan to one or more computing devices, computing systems, etc. In such an example, the plan may be generated responsive to input form one of the one or more computing devices, computing systems, etc. In such an example, the input may be from an executing program (e.g., an application, an app, firmware, etc.).

As an example, a system can include a processor; memory accessible to the processor; processor-executable instructions stored in the memory and executable by the processor to instruct the system to: in a runtime environment of compiled multi-domain code for multiple different domains that describe physical operations, responsive to input, issue a call to a planning domain definition language (PDDL) planner; responsive to the call, receive a plan that includes at least one action; and dispatch at least one of the at least one action to call for performance of at least a portion of at least one of the physical operations.

As an example, one or more computer-readable storage media can include computer-executable instructions executable to instruct a computing system to: in a runtime environment of compiled multi-domain code for multiple different domains that describe physical operations (e.g., including one or more physical operations that can be performed using equipment), responsive to input, issue a call to a planning domain definition language (PDDL) planner; responsive to the call, receive a plan that includes at least one action; and dispatch at least one of the at least one action to call for performance of at least a portion of at least one of the physical operations.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

As an example, a computer program product can include computer-executable instructions to instruct a computing system to perform a method such as, for example, the method 1610 of FIG. 16, etc.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 18:
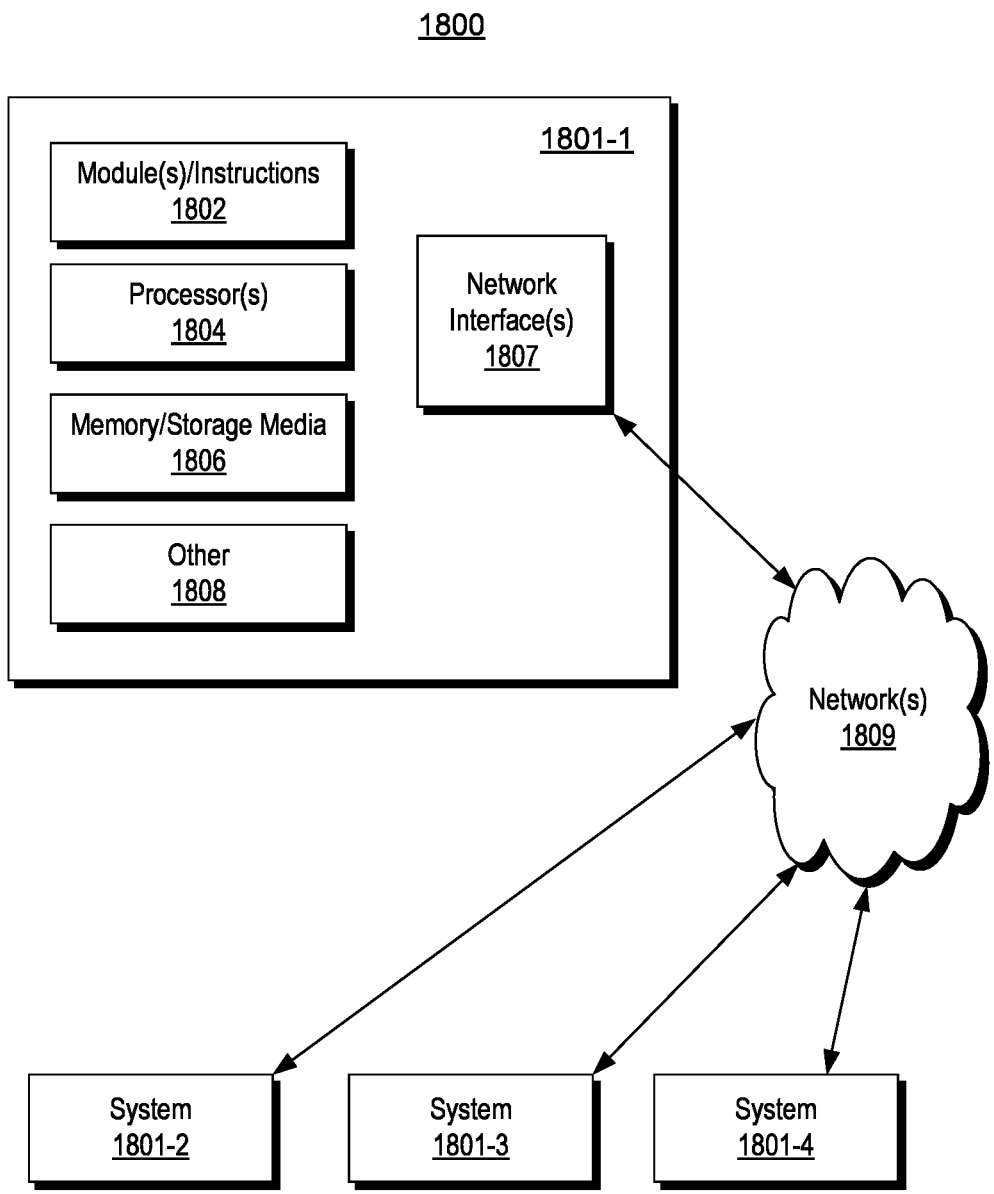
FIG. 18 illustrates an example of a computing system.

In some embodiments, a method or methods may be executed by a computing system. FIG. 18 shows an example of a system 1800 that can include one or more computing systems 1801-1, 1801-2, 1801-3 and 1801-4, which may be operatively coupled via one or more networks 1809, which may include wired and/or wireless networks.

As an example, a system can include an individual computer system or an arrangement of distributed computer systems. In the example of FIG. 18, the computer system 1801-1 can include one or more modules 1802, which may be or include processor-executable instructions, for example, executable to perform various tasks (e.g., receiving information, requesting information, processing information, simulation, outputting information, etc.).

As an example, a module may be executed independently, or in coordination with, one or more processors 1804, which is (or are) operatively coupled to one or more storage media 1806 (e.g., via wire, wirelessly, etc.). As an example, one or more of the one or more processors 1804 can be operatively coupled to at least one of one or more network interface 1807. In such an example, the computer system 1801-1 can transmit and/or receive information, for example, via the one or more networks 1809 (e.g., consider one or more of the Internet, a private network, a cellular network, a satellite network, etc.).

As an example, the computer system 1801-1 may receive from and/or transmit information to one or more other devices, which may be or include, for example, one or more of the computer systems 1801-2, etc. A device may be located in a physical location that differs from that of the computer system 1801-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1806 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 19:
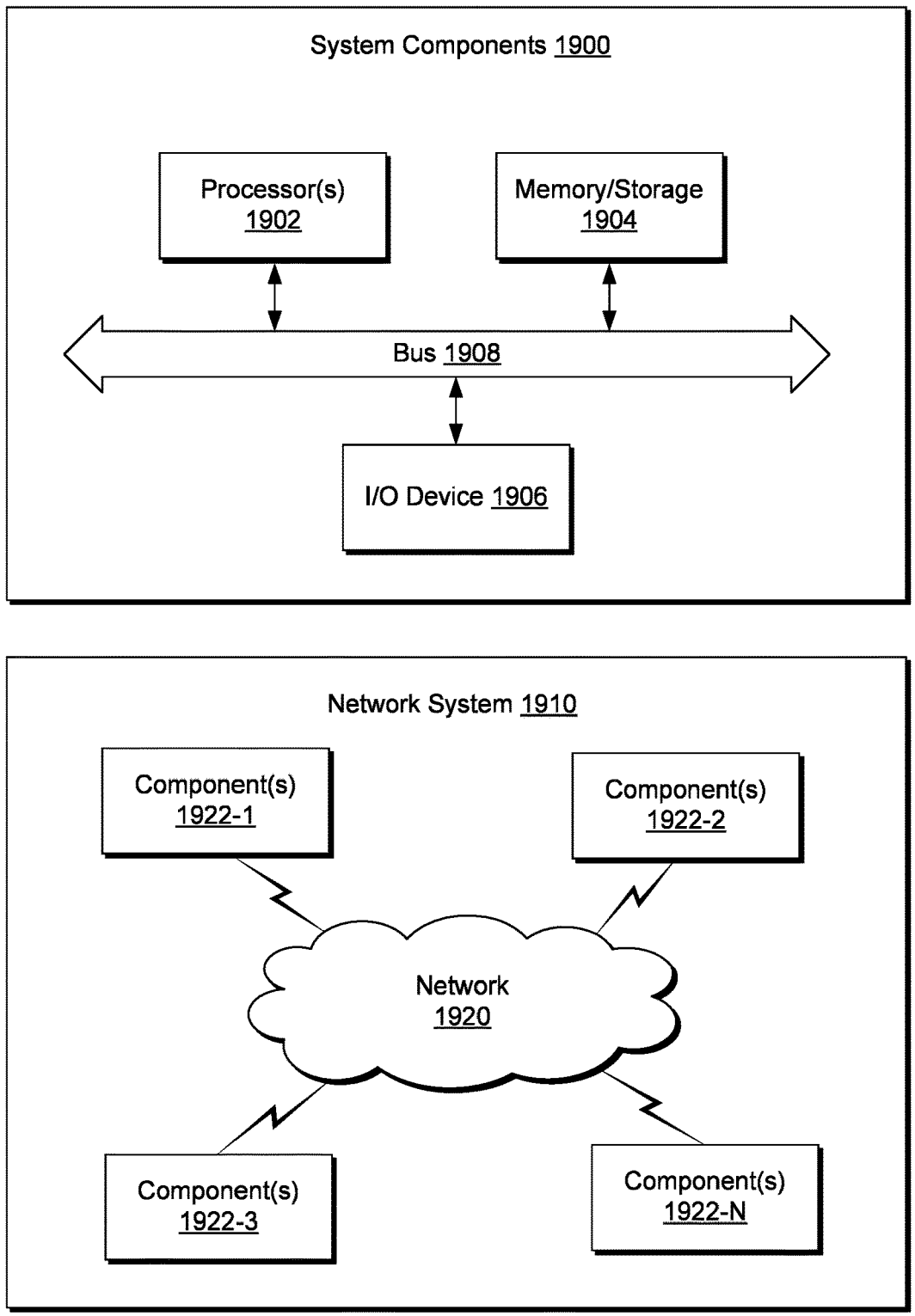
FIG. 19 illustrates example components of a system and a networked system.

FIG. 19 shows components of a computing system 1900 and a networked system 1910 that includes a network 1920. The system 1900 includes one or more processors 1902, memory and/or storage components 1904, one or more input and/or output devices 1906 and a bus 1908. According to an embodiment, instructions may be stored in one or more computer-readable media (e.g., memory/storage components 1904). Such instructions may be read by one or more processors (e.g., the processor(s) 1902) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 1906). According to an embodiment, a computer-readable medium may be a storage component such as a physical memory storage device, for example, a chip, a chip on a package, a memory card, etc.

According to an embodiment, components may be distributed, such as in the network system 1910. The network system 1910 includes components 1922-1, 1922-2, 1922-3, . . . 1922-N. For example, the components 1922-1 may include the processor(s) 1902 while the component(s) 1922-3 may include memory accessible by the processor(s) 1902. Further, the component(s) 1922-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
in a computer runtime environment of compiled multi-domain code for multiple different domains that describe physical operations performed using equipment, responsive to receiving input, issuing a call to a planning domain definition language planner,
wherein the multiple different domains include at least one parent-child relationship between a parent domain and a child domain;
responsive to issuing the call, receiving a plan that comprises a parent domain plan having multiple instances of a child domain plan,
wherein the child domain plan includes actions to drill a length of a borehole, and the parent domain plan includes actions to drill a multiple of the length; and
controlling drilling equipment to execute at least one action of the child domain plan.

2. The method of claim 1, wherein the multiple different domains comprise at least two tiers.

3. The method of claim 1, further comprising:
responsive to receiving the input, issuing another call to another planning domain definition language planner; and, responsive to issuing the another call, receiving another plan.

4. The method of claim 3, wherein the planning domain definition language planner and the another planning domain definition language planner are separate instances of the same planning domain definition language planner.

5. The method of claim 3, wherein the planning domain definition language planner and the another planning domain definition language planner are instances of different planning domain definition language planners.

6. The method of claim 1, further comprising:
generating the compiled multidomain code using a multidomain description language, wherein at least one relationship between two of the multiple different domains is described using the multidomain description language.

7. The method of claim 1, wherein the runtime environment is implemented using a framework in a runtime mode and wherein the framework is operable in a development mode for generating the compiled multi-domain code.

8. The method of claim 1, further comprising:
receiving the input from an executing program on a computing device, wherein the dispatching comprises dispatching the at least one of the at least one action to the computing device or to a different computing device.

9. The method of claim 1, wherein the at least one action of the child domain includes rotating a drill, halting rotation of a drill, lifting a drill bit off-bottom, going in-slips, going out-of-slips, enabling a mud pump, disabling a mud pump, or going on-bottom.

10. The method of claim 1, wherein the at least one action of the child domain includes drilling a stand according to a set of parameters at least including a hole depth, a connection depth, a target depth, a stand length, or a friction test requirement.

11. The method of claim 1, further comprising:
receiving, during execution of the at least one action of the child plan, measurement while drilling (MWD) or downhole drilling dynamics sensor data related to a drilling operation;
modifying at least another action of the child plan based on the MWD or downhole drilling dynamics sensor data; and
controlling the drilling equipment to execute the at least another action of the child plan according to the modification.

12. A system comprising:
a processor;
memory accessible to the processor; and
processor-executable instructions stored in the memory and executable by the processor to instruct the system to perform operations comprising:
in a runtime environment of compiled multi-domain code for multiple different domains that describe physical operations performed using equipment, responsive to receiving input, issuing a call to a planning domain definition language planner,
wherein the multiple different domains include at least one parent-child relationship between a parent domain and a child domain;
responsive to issuing the call, receiving a plan that comprises a parent domain plan having multiple instances of a child domain plan, wherein the child domain plan includes actions to drill a length of a borehole, and the parent domain plan includes actions to drill a multiple of the length; and controlling drilling equipment to execute at least one action of the child domain plan.

13. The system of claim 12, wherein the operations further comprise:

using a multi-domain description language to generate the compiled multi-domain code, wherein at least one relationship between two of the multiple different domains is described using the multidomain description language.

14. The system of claim 12, wherein the operations further comprise:

implementing the runtime environment using a framework in a runtime mode, wherein the framework is operable in a development mode for generating the compiled multi-domain code.

15. A non-transitory computer-readable storage medium storing instructions that, when executed by a processor, cause the processor to performs a method comprising:

in a computer runtime environment of compiled multi-domain code for multiple different domains that describe physical operations performed using equipment, responsive to receiving input, issuing a call to a planning domain definition language planner, wherein the multiple different domains include at least one parent-child relationship between a parent domain and a child domain;

responsive to issuing the call, receiving a plan that comprises a parent domain plan having multiple instances of a child domain plan, wherein the child domain plan includes actions to drill a length of a borehole, and the parent domain plan includes actions to drill a multiple of the length; and control drilling equipment to execute at least one action of the child domain plan.

16. The non-transitory computer-readable storage medium of claim 15, wherein the method further comprises:

generating the compiled multi-domain code using a multi-domain description language, wherein at least one relationship between two of the multiple different domains is described using the multi-domain description language.

17. The non-transitory computer-readable storage medium of claim 15, wherein the runtime environment is implemented using a framework in a runtime mode and wherein the framework is operable in a development mode for generating the compiled multi-domain code.

18. The non-transitory computer-readable storage medium of claim 15, wherein the method further comprises;

receiving the input from an executing program on a computing device and wherein the dispatching comprises dispatching the at least one of the at least one action to the computing device or to a different computing device.

* * * * *